(12) United States Patent
Fukawatase et al.

(10) Patent No.: US 10,668,887 B2
(45) Date of Patent: Jun. 2, 2020

(54) VEHICLE SEAT WITH SIDE AIRBAG DEVICE

(71) Applicant: TOYOTA JIDOSHA KABUSHIKI KAISHA, Aichi-ken (JP)

(72) Inventors: Osamu Fukawatase, Miyoshi (JP); Takamichi Komura, Okazaki (JP); Masato Kunisada, Susono (JP); Hiroyuki Nagura, Chiryu (JP); Takuma Kawai, Susono (JP); Takayuki Shimizu, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 111 days.

(21) Appl. No.: 15/887,691

(22) Filed: Feb. 2, 2018

(65) Prior Publication Data

US 2018/0222435 A1    Aug. 9, 2018

(30) Foreign Application Priority Data

Feb. 3, 2017    (JP) .................................. 2017-018647

(51) Int. Cl.
 *B60R 21/231* (2011.01)
 *B60R 21/207* (2006.01)
 (Continued)

(52) U.S. Cl.
 CPC ...... *B60R 21/23138* (2013.01); *B60R 21/207* (2013.01); *B60R 21/233* (2013.01);
 (Continued)

(58) Field of Classification Search
 CPC ............ B60R 21/23138; B60R 21/207; B60R 21/231; B60R 21/233; B60R 21/2338;
 (Continued)

(56) References Cited

U.S. PATENT DOCUMENTS 3,792,873 A * 2/1974 Buchner ................. B60R 21/23
                                                                280/743.1
6,224,092 B1 * 5/2001 Sakamoto ............. B60R 21/207
                                                                280/730.2
(Continued)

FOREIGN PATENT DOCUMENTS

DE    102007000291 A1    11/2007
DE    102008052480 A1    6/2009
(Continued)

OTHER PUBLICATIONS

Extended European Search Report for EP 18154751 dated Apr. 26, 2018, 7 pp.

*Primary Examiner* — Karen Beck
(74) *Attorney, Agent, or Firm* — Hauptman Ham, LLP

(57) ABSTRACT

A vehicle seat with a side airbag device includes: a gas generating device attached to an inner side of an outer side frame in a vehicle-width direction, which is disposed in a side portion on an outside of a seat back in the vehicle-width direction; a side airbag which inflates and deploys to expand over the outer side frame from a vehicle front side of the outer side frame in the vehicle-width direction by receiving gas from the gas generating device accommodated in the side airbag; and an inflation width expansion portion which is provided in the side airbag and causes an inflation width of the side airbag in the vehicle-width direction to be greater outside a side surface provided on an outside of the outer side frame in the vehicle-width direction than inside the side surface.

19 Claims, 23 Drawing Sheets

(51) Int. Cl.
*B60R 21/2338* (2011.01)
*B60R 21/233* (2006.01)
*B60R 21/26* (2011.01)
*B60R 21/237* (2006.01)
*B60R 21/235* (2006.01)

(52) U.S. Cl.
CPC .......... *B60R 21/2338* (2013.01); *B60R 21/26* (2013.01); *B60R 21/237* (2013.01); *B60R 2021/23146* (2013.01); *B60R 2021/23382* (2013.01); *B60R 2021/23386* (2013.01); *B60R 2021/23509* (2013.01)

(58) Field of Classification Search
CPC .... B60R 2021/23382; B60R 21/23386; B60R 2021/23146
See application file for complete search history.

(56) References Cited

U.S. PATENT DOCUMENTS

| | | | | |
|---|---|---|---|---|
| 7,695,004 | B2 * | 4/2010 | Inoue | B60R 21/207 280/730.2 |
| 8,469,395 | B2 * | 6/2013 | Richez | B60R 21/207 280/730.2 |
| 8,480,128 | B2 * | 7/2013 | Fukawatase | B60R 21/23138 280/730.2 |
| 8,596,675 | B2 * | 12/2013 | Kwon | B60R 21/233 280/729 |
| 8,939,464 | B2 * | 1/2015 | Acker | B60R 21/207 280/728.3 |
| 9,428,134 | B2 * | 8/2016 | Hiraiwa | B60R 21/207 |
| 9,669,789 | B2 * | 6/2017 | Fujiwara | B60R 21/23138 |
| 9,783,151 | B2 * | 10/2017 | Fujiwara | B60R 21/233 |
| 9,827,940 | B2 * | 11/2017 | Hanks | B60R 21/26 |
| 9,849,857 | B2 * | 12/2017 | Fujiwara | B60R 21/231 |
| 2006/0001244 | A1 * | 1/2006 | Taguchi | B60R 21/23138 280/729 |
| 2006/0119083 | A1 * | 6/2006 | Peng | B60R 21/207 280/730.2 |
| 2006/0255572 | A1 * | 11/2006 | Svenbrandt | B60R 21/207 280/730.2 |
| 2007/0252368 | A1 | 11/2007 | Balser et al. | |
| 2007/0273129 | A1 * | 11/2007 | Inoue | B60R 21/207 280/730.2 |
| 2011/0298201 | A1 * | 12/2011 | Kobayashi | B60R 21/207 280/736 |
| 2012/0038136 | A1 | 2/2012 | Feller et al. | |
| 2012/0200072 | A1 * | 8/2012 | Fukawatase | B60R 21/23138 280/741 |
| 2013/0119646 | A1 * | 5/2013 | Tracht | B60R 21/207 280/730.1 |
| 2013/0292929 | A1 * | 11/2013 | Fukawatase | B60R 21/207 280/730.2 |
| 2014/0103625 | A1 * | 4/2014 | Thomas | B60R 21/207 280/730.2 |
| 2015/0021884 | A1 * | 1/2015 | Hiraiwa | B60R 21/207 280/728.2 |
| 2015/0115583 | A1 | 4/2015 | Azuma et al. | |
| 2015/0158453 | A1 | 6/2015 | Fujiwara | |
| 2015/0217714 | A1 | 8/2015 | Fujiwara | |
| 2015/0367803 | A1 | 12/2015 | Fujiwara | |
| 2015/0367804 | A1 * | 12/2015 | Fujiwara | B60R 21/23138 280/730.2 |
| 2016/0264091 | A1 * | 9/2016 | Fujiwara | B60R 21/2346 |
| 2016/0368449 | A1 * | 12/2016 | Fujiwara | B60R 21/231 |
| 2018/0093633 | A1 * | 4/2018 | Komura | B60R 21/217 |
| 2019/0047504 | A1 * | 2/2019 | Sugishima | B60R 21/207 |
| 2019/0084516 | A1 * | 3/2019 | Fukawatase | B60R 21/207 |
| 2019/0135219 | A1 * | 5/2019 | Kobayashi | B60N 2/42 |
| 2019/0232914 | A1 * | 8/2019 | Kobayashi | B60R 21/207 |

FOREIGN PATENT DOCUMENTS

| | | | | |
|---|---|---|---|---|
| DE | 102011086471 A1 | | 5/2013 | |
| EP | 3300958 A1 | * | 4/2018 | .......... B60R 21/217 |
| EP | 3300959 A1 | * | 4/2018 | ......... B60R 21/2338 |
| EP | 3357764 A1 | * | 8/2018 | ....... B60R 21/23138 |
| EP | 3290276 B1 | * | 4/2019 | .......... B60R 21/207 |
| JP | H1081187 A | | 3/1998 | |
| JP | 2006-513083 A | | 4/2006 | |
| JP | 2007-314075 A | | 12/2007 | |
| JP | 2008-526619 A | | 7/2008 | |
| JP | 2012-071834 A | | 4/2012 | |
| JP | 2013-095300 A | | 5/2013 | |
| JP | 2015-182698 A | | 10/2015 | |
| JP | 2015182698 A | * | 10/2015 | |
| JP | 2015-231839 A | | 12/2015 | |
| JP | 2016-7902 A | | 1/2016 | |
| WO | 2004062970 A1 | | 7/2004 | |
| WO | 2012/101809 A1 | | 8/2012 | |
| WO | 2013/168556 A1 | | 11/2013 | |
| WO | 2014/033820 A1 | | 3/2014 | |
| WO | 2015/001912 A1 | | 1/2015 | |
| WO | 2017/209192 A1 | | 12/2017 | |

* cited by examiner

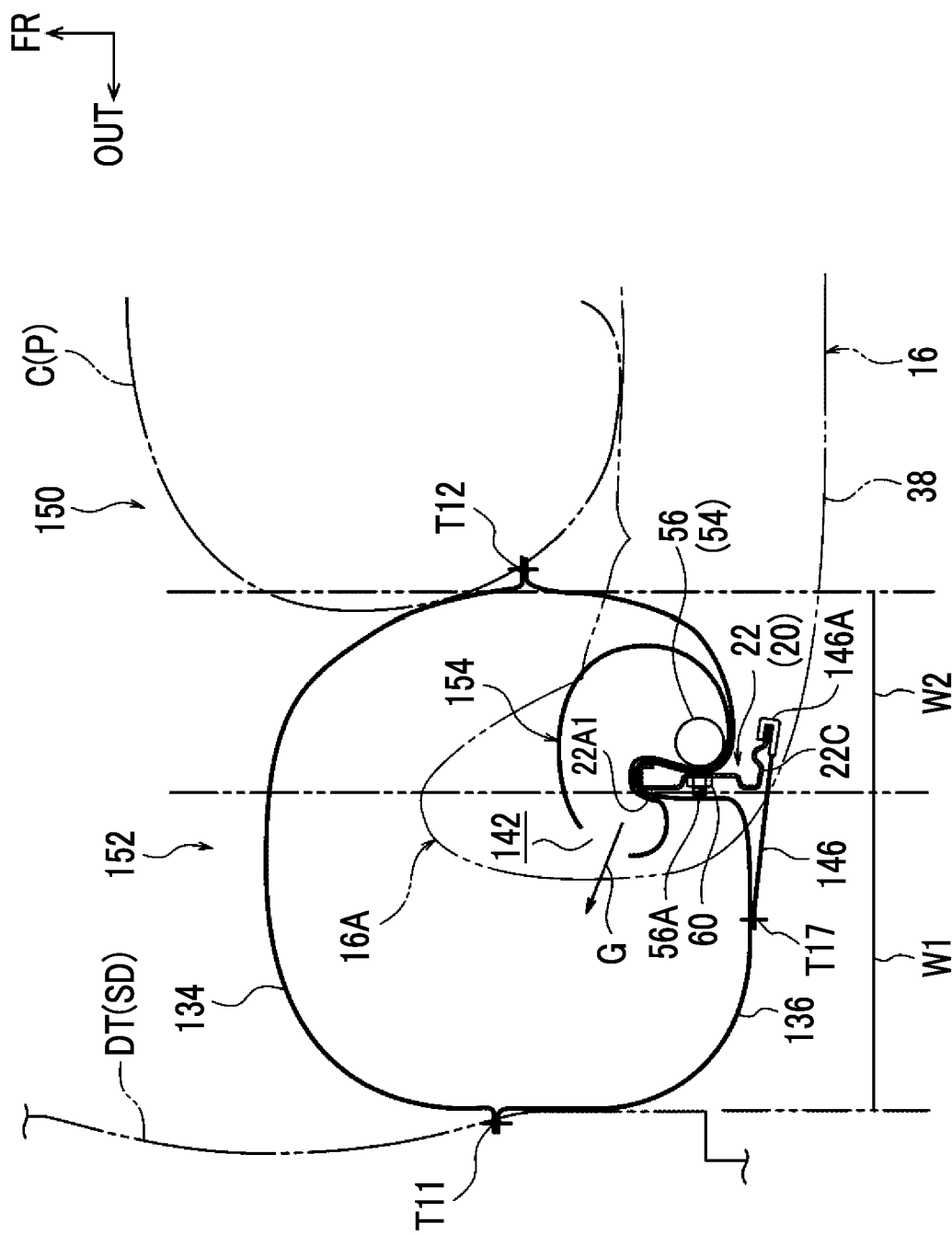

VEHICLE SEAT WITH SIDE AIRBAG DEVICE

INCORPORATION BY REFERENCE

The disclosure of Japanese Patent Application No. 2017-018647 filed on Feb. 3, 2017 including the specification, drawings and abstract is incorporated herein by reference in its entirety.

BACKGROUND

1. Technical Field

The present disclosure relates to a vehicle seat with a side airbag device.

2. Description of Related Art

In a vehicle seat described in Japanese Unexamined Patent Application Publication No. 2006-513083 (JP 2006-513083 A), an airbag unit (side airbag module) is disposed inward of a beam (outer side frame) included in the frame of a seat back in a vehicle cabin. In the side airbag module, an inflator (gas generating device) disposed in the rearmost region of the outer side frame introduces gas substantially in a forward direction in an airbag (side airbag) during a side collision of the vehicle. Accordingly, at least a portion of the side airbag is caused to widen (inflate and deploy) between the outer side frame and a seated occupant.

SUMMARY

In the vehicle seat having the above configuration, at least a portion of the side airbag inflates and deploys between the outer side frame and the seated occupant, and at least the portion of the side airbag receives a reaction force from the outer side frame toward the seated occupant fast. Accordingly, the seated occupant can be restrained fast by at least the portion of the side airbag.

However, in the vehicle seat having the above configuration, since the gas generating device attached to the inside of the outer side frame in the vehicle cabin (inside in a vehicle-width direction) introduces the gas substantially in the forward direction in the side airbag, the side airbag easily inflates and deploys toward a vehicle front side and the inside in the vehicle-width direction and is less likely to inflate and deploy toward the outside in the vehicle-width direction (toward a vehicle cabin side portion). Therefore, it is difficult for the reaction force from the vehicle cabin side portion to be applied to the side airbag until the vehicle cabin side portion intrudes toward the inside in the vehicle-width direction due to a collision load of the side collision. As a result, the occupant restraining force of the side airbag at an initial stage of restraining the occupant by the side airbag temporarily decreases. Therefore, there is room for improvement from the viewpoint of further improving the initial occupant restraint performance of the side airbag.

The disclosure provides a vehicle seat with a side airbag device capable of improving the initial occupant restraint performance of the side airbag in a configuration in which a gas generating device is attached to the inside of an outer side frame in a seat back in a vehicle-width direction.

An aspect relates to a vehicle seat with a side airbag device. The vehicle seat includes a gas generating device attached to an inner side of an outer side frame in a vehicle-width direction, the outer side frame being disposed in a side portion on an outside of a seat back in the vehicle-width direction; a side airbag which inflates and deploys to expand over the outer side frame from a vehicle front side of the outer side frame in the vehicle-width direction by receiving gas from the gas generating device accommodated in the side airbag; and an inflation width expansion portion which is provided in the side airbag and causes an inflation width of the side airbag in the vehicle-width direction to be greater outside a side surface provided on an outside of the outer side frame in the vehicle-width direction than inside the side surface.

According to the aspect, the gas generating device is attached to the inside of the outer side frame in the vehicle-width direction (the center side in the vehicle-width direction), the outer side frame being disposed in the side portion on the outside of the seat back in the vehicle-width direction. For example, the gas generating device is operated in a case where a side collision of a vehicle is detected or predicted. The side airbag that accommodates the gas generating device therein then inflates and deploys in the state of extending over the outer side frame from the vehicle front side in the vehicle-width direction. The inflated and deployed side airbag receives a reaction force from the outer side frame and retrains the seated occupant fast. Furthermore, according to the aspect, the inflation width expansion portion provided in the side airbag causes the inflation width of the side airbag in the vehicle-width direction to be greater outside the side surface provided on the outside of the outer side frame in the vehicle-width direction than inside the side surface in the vehicle-width direction. Accordingly, the inflated and deployed side airbag easily receives a reaction force fast from the vehicle cabin side portion as well as from the outer side frame, and thus the initial occupant restraint performance of the side airbag can be further improved.

In the vehicle seat according to the aspect, the inflation width expansion portion may be an additional chamber which is attached to an outer side surface of the side airbag in the vehicle-width direction, the side airbag being in an inflated and deployed state, and the additional chamber being configured to inflate and deploy toward an outside in the vehicle-width direction by being supplied with the gas from the gas generating device.

According to the aspect, when the gas generating device is operated, the side airbag inflates and deploys in the state of extending over the outer side frame from the vehicle front side in the vehicle-width direction, and the additional chamber attached to the outer side surface of the side airbag in the vehicle-width direction, the outer surface of the side airbag inflates and deploys toward the outside in the vehicle-width direction. Accordingly, the side airbag can be caused to inflate and deploy to a sufficiently large extent toward the outside in the vehicle-width direction with a simple configuration.

In the vehicle seat according to the aspect, a gas introduction port may be provided in the outer side surface of the side airbag in the vehicle-width direction, the additional chamber may include a pair of front base cloth and rear base cloth arranged in a front-rear direction of the side airbag, outer peripheral portions of the front base cloth and the rear base cloth excluding first end edge portions may be joined to each other, and the first end edge portions may be joined to an edge portion of the gas introduction port of the gas introduction port in the outer side surface of the side airbag in the vehicle-width direction.

According to the aspect, the gas from the gas generating device is supplied into the additional chamber through the gas introduction port formed in the outer side surface of the side airbag in the vehicle-width direction such that the additional chamber inflates and deploys toward the outside in the vehicle-width direction. Since the additional chamber is formed by joining the front base cloth and the rear base cloth to each other as described above, the manufacturing of the additional chamber is easy.

In the vehicle seat according to the aspect, a gas introduction port may be provided in the outer side surface of the side airbag in the vehicle-width direction, the additional chamber may include a pair of right base cloth and left base cloth arranged in a right-left direction of the side airbag and having outer peripheral portions joined to each other, and an edge portion of the gas introduction port provided in one of the right base cloth and the left base cloth may be joined to an edge portion of the gas introduction port in the outer side surface of the side airbag in the vehicle-width direction.

According to the aspect, the gas from the gas generating device is supplied into the additional chamber through the gas introduction port formed in the outer side surface of the side airbag in the vehicle-width direction in the inflated and deployed state and the gas introduction port formed in one of the right base cloth and the left base cloth of the additional chamber. Accordingly, the additional chamber inflates and deploys toward the outside in the vehicle-width direction. Since the additional chamber is formed by joining the right base cloth and the left base cloth to each other as described above, the manufacturing of the additional chamber is easy. Furthermore, since the edge portion of the gas introduction port formed in one of the right base cloth and the left base cloth is configured to be joined to the edge portion of the gas introduction port formed in the outer side surface of the side airbag in the vehicle-width direction, compared to the aspect, the inflation width of the additional chamber in the vehicle-width direction is easily secured. Therefore, it is easy to partially increase the energy absorption stroke of the side airbag.

In the vehicle seat according to the aspect, the inflation width expansion portion may be an outer excess length portion which is configured in base cloth of the side airbag such that, in a plan sectional view of the side airbag, a peripheral length of the side airbag is greater outside the side surface in the vehicle-width direction than inside the side surface in the vehicle-width direction.

According to the aspect, the outer excess length portion which is configured in the base cloth of the side airbag causes the peripheral length of the side airbag in the inflated and deployed state in the plan sectional view of the side airbag to be greater outside the side surface of the outer side frame in the vehicle-width direction than inside the side surface in the vehicle-width direction. Accordingly, the side airbag can be caused to inflate and deploy to a large extent toward the outside in the vehicle-width direction with a simple configuration.

In the vehicle seat according to the aspect, the base cloth of the side airbag may include outer base cloth, and inner base cloth which is positioned inward of the outer base cloth in the vehicle-width direction in the inflated and deployed state of the side airbag, the outer base cloth and the inner base cloth may be formed to have the same size and shape to cause outer peripheral portions of the outer base cloth and the inner base cloth to be joined to each other, the side airbag may be fixed to the outer side frame by using a stud bolt of the gas generating device which penetrates through the inner base cloth and the outer side frame, and the outer excess length portion may be formed of a portion of the outer base cloth and a portion of the inner base cloth.

According to the aspect, the base cloth of the side airbag includes the outer base cloth and the inner base cloth which are formed to have the same size and shape to cause the outer peripheral portions thereof to be joined to each other, and the side airbag is fixed to the outer side frame by using the stud bolt of the gas generating device which penetrates through the inner base cloth and the outer side frame. In addition, the outer excess length portion is formed of a portion of the outer base cloth and a portion of the inner base cloth. According to the aspect, since the side airbag is manufactured by using the outer base cloth and the inner base cloth having the same size and shape as described above, the side airbag which easily inflates and deploys to a large extent toward the outside in the vehicle-width direction can be manufactured by using an existing side airbag.

In the vehicle seat according to the aspect, the inflation width expansion portion may be a strap in which a first end portion is joined to the outer side surface of the side airbag vehicle-width direction in an inflated and deployed state of the side airbag and a second end portion is locked or fixed to the outer side frame and is extended during inflation and deployment of the side airbag to pull the outer side surface of the side airbag in the vehicle-width direction toward a vehicle rear side.

According to the aspect, when the side airbag inflates and deploys, the strap in which the first end portion is joined to the outer side surface of the side airbag in the vehicle-width direction and the second end portion is locked or fixed to the outer side frame extends to pull the outer side surface of the side airbag in the vehicle-width direction toward the vehicle rear side. Accordingly, the inflation width of the side airbag in the vehicle-width direction is greater outside the side surface provided on the outside of the outer side frame in the vehicle-width direction than inside the side surface in the vehicle-width direction. That is, since the side airbag is forcibly inflated and deployed toward the outside in the vehicle-width direction by the strap, it is easy to cause the side airbag to inflate and deploy to a large extent toward the outside in the vehicle-width direction. Furthermore, the deployment behavior of the side airbag can be stabilized by the tension of the strap.

In the vehicle seat according to the aspect, the side airbag may be formed in a bag shape by joining front base cloth and rear base cloth arranged in a vehicle front-rear direction to each other in the inflated and deployed state of the side airbag.

According to the aspect, the side airbag is formed in a bag shape by joining the front base cloth and the rear base cloth arranged in the vehicle front-rear direction to each other in the inflated and deployed state. Here, for example, a general side airbag is formed in a bag shape by joining a pair of sheets of base cloth arranged in the vehicle-width direction in the inflated and deployed state and thus easily inflates and deploys in the vehicle front-rear direction in the plan view. Contrary to this, the side airbag according to the aspect easily inflates and deploys in the vehicle-width direction in the plan view, and thus the side airbag easily inflates and deploys between the seated occupant and the vehicle cabin side portion without gaps within a short period of time.

In the vehicle seat according to the aspect, the side airbag may be divided into a front chamber and a rear chamber by a front-rear partition tether including a front-rear partition portion which extends in an up-down direction of the side airbag and is provided with communication ports, the gas generating device may be accommodated in the rear chamber, and the rear chamber may be configured to come into contact with a seated occupant and a vehicle cabin side portion in a state in which the side airbag is inflating and deploying.

According to the aspect, the gas generated by the gas generating device in the rear chamber in the side airbag is supplied to the front chamber through the communication port formed in the front-rear partition portion. Accordingly, the rear chamber inflates and deploys faster at a higher pressure than the front chamber. In addition, the rear chamber that inflates and deploys faster at a higher pressure than the front chamber as described above comes into contact with the seated occupant and the vehicle cabin side portion in a state in which the side airbag is inflating and deploying (a state before inflation and deployment of the side airbag is completed). Accordingly, the rear chamber having a higher pressure than the front chamber receives a reaction force fast from the vehicle cabin side portion and restrains the seated occupant, and thus the initial occupant restraint performance can be further improved.

In the vehicle seat according to the aspect, in a rear portion of the side airbag, a diffuser may be disposed, the diffuser having a bottomed tubular shape with an opening at an upper end portion of the diffuser and being made of cloth accommodating the gas generating device in the diffuser, and a front extension portion which extends toward the vehicle front side may be provided in a lower end portion of the diffuser positioned at a height of the waist of the seated occupant in the inflated and deployed state of the side airbag.

According to the aspect, the diffuser which has a bottomed tubular shape with the opening at its upper end portion and is made of cloth is disposed in the rear portion of the side airbag, and the gas generating device is accommodated in the diffuser. Therefore, when the gas generating device is operated, the diffuser inflates and deploys fast at a high pressure while ejecting the gas into the side airbag from the opening of the upper end portion. Since the diffuser that inflates and deploys fast at a high pressure is provided in the side airbag as described above, a region that reaches a high pressure can be easily adjusted by setting the size or shape of the diffuser. The front extension portion which extends toward the vehicle front side is provided in the lower end portion of the diffuser positioned at the height of the waist of the seated occupant in the inflated and deployed state of the side airbag. Accordingly, a relatively wide range of the waist of the seated occupant can be restrained fast by the diffuser having a high pressure. In addition, even in a case where the diffuser inflates and deploys in a state in which the seated occupant is located at an inappropriate position which is the inflation and deployment region of the side airbag, the waist of the seated occupant that has relatively high load resistance receives a load from the diffuser, and thus so-called OOP performance (the ability to further reduce the harmfulness to the seated occupant at the inappropriate position) can be favorably secured.

In the vehicle seat according to the aspect, the diffuser has a gas ejecting port which ejects gas generated by the gas generating device toward the outside in the vehicle-width direction.

According to the aspect, the gas generated by the gas generating device in the side airbag is ejected upward from the opening at the upper end portion of the diffuser and is ejected toward the outside in the vehicle-width direction from the gas ejecting port formed in the diffuser. Accordingly, the side airbag easily inflates and deploys fast toward the outside in the vehicle-width direction. Since the gas ejected from the gas ejecting port is ejected toward the opposite side from the seated occupant, the safety of the seated occupant can be favorably secured.

In the vehicle seat according to the aspect, the rear base cloth may be longer than the front base cloth in a plan sectional view by an excess length portion provided in the rear base cloth, the excess length portion may be a pleat which protrudes toward an inside of the side airbag and extends in an up-down direction of the side airbag, and the outer side frame may be fitted into the pleat from the vehicle rear side.

According to the aspect, as described above, the outer side frame is fitted into the pleat formed in the rear base cloth of the side airbag from the vehicle rear side. Accordingly, the side airbag that inflates and deploys in the state of extending over the outer side frame from the vehicle front side in the vehicle-width direction easily inflates toward the vehicle rear side and the outside in the vehicle-width direction outside the outer side frame in the vehicle-width direction. Therefore, the side airbag easily comes into contact with the vehicle cabin side portion faster.

In the vehicle seat according to the aspect, a front-rear partition tether may be provided between the front base cloth and the rear base cloth and may be jointed to a joint between the front base cloth and the rear base cloth.

According to the aspect, since the front base cloth and the rear base cloth can be joined together with the front-rear partition tether, the side airbag divided into the two front and rear chambers by the front-rear partition tether can be easily manufactured.

In the vehicle seat according to the aspect, in a rear portion of the side airbag, a diffuser which has a tubular shape with openings at both upper and lower end portions of the diffuser and is made of cloth accommodating the gas generating device in the diffuser may be disposed, and the diffuser may have a gas ejecting port which ejects gas generated by the gas generating device to be ejected toward the outside in the vehicle-width direction.

According to the aspect, the gas generated by the gas generating device in the side airbag is ejected upward and downward from the upper and lower openings of the diffuser and is ejected toward the outside in the vehicle-width direction from the gas ejecting port formed in the diffuser. Accordingly, the side airbag easily inflates and deploys fast toward the outside in the vehicle-width direction. Since the gas ejected from the gas ejecting port is ejected toward the opposite side from the seated occupant, the safety of the seated occupant can be favorably secured.

In the vehicle seat according to the aspect, the side airbag may be divided into a front chamber and a rear chamber by a front-rear partition tether including a front-rear partition portion which extends in an up-down direction of the side airbag and is provided with communication ports, the gas generating device may be accommodated in the rear chamber, and the capacity of the additional chamber may be smaller than the capacity of the rear chamber.

In the vehicle seat according to the aspect, the rear chamber may include a chest-abdomen restraint portion that restrains rear portions of the chest and the abdomen of an occupant seated on the vehicle seat, and a waist restraint portion that restrains a front portion and a rear portion of the waist of the occupant, the chest-abdomen restraint portion may inflate and deploy primarily within an outer side portion on a vehicle rear side of the front chamber and restrain portions from an upper end portion of the rear portion of the chest of the occupant to a lower end portion of the rear portion of the abdomen of the occupant, and a rear portion side of the waist restraint portion which restrains the rear portion of the waist of the occupant may inflate and deploy within the outer side portion, and a front portion side of the waist restraint portion which restrains the front portion of the waist of the occupant may inflate and deploy toward a vehicle front side relative to the outer side portion along with the front chamber.

As described above, with the vehicle seat with a side airbag device according to the aspect, the initial occupant restraint performance of the side airbag in the configuration in which the gas generating device is attached to the inside of the outer side frame in the seat back in the vehicle-width direction can be further improved.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 21 is a plan view illustrating an inflated and deployed state of a side airbag in a vehicle seat with a side airbag device according to a fifth embodiment;

DETAILED DESCRIPTION OF EMBODIMENTS

Figure 1:
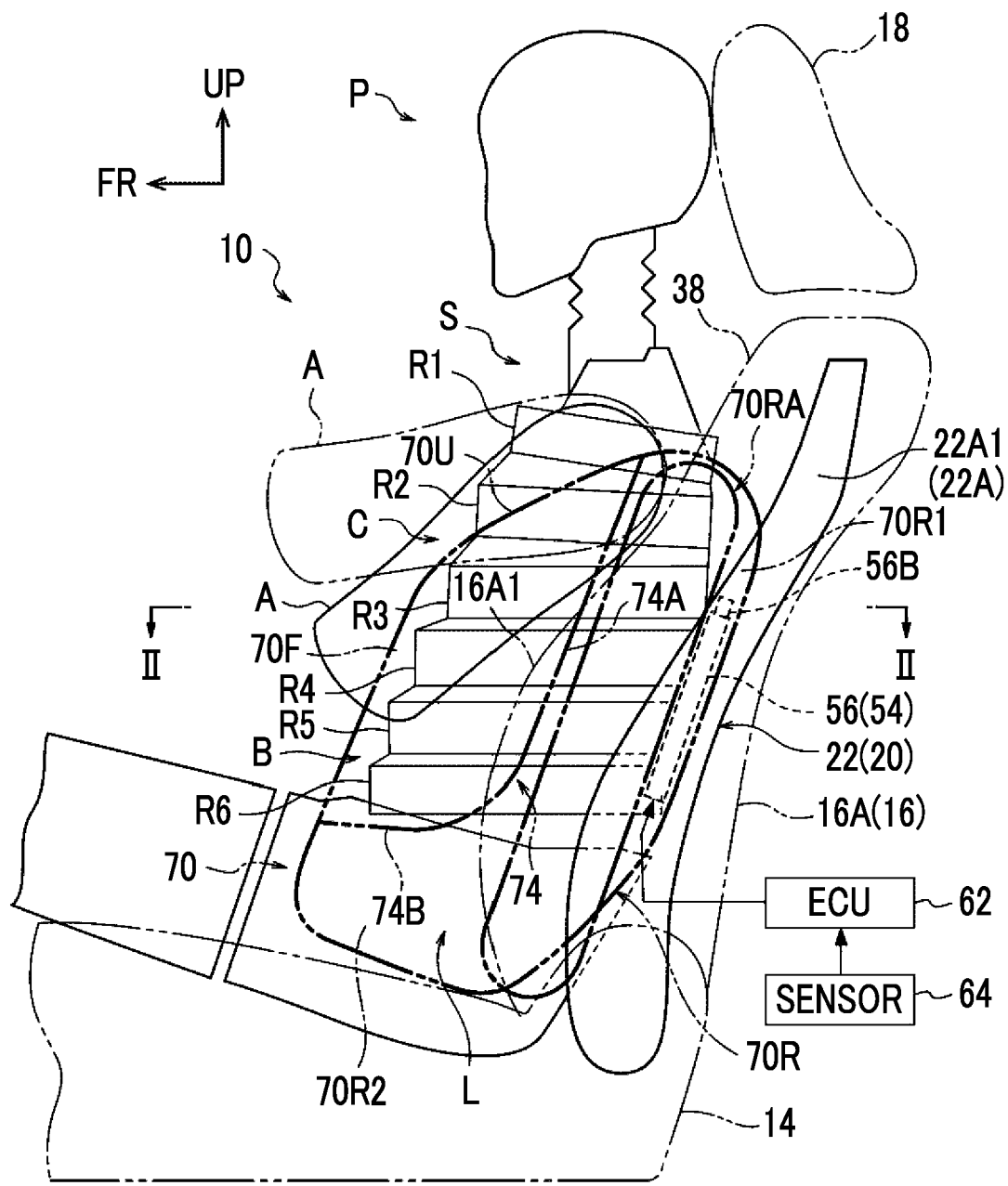
FIG. 1 is a side view illustrating an inflated and deployed state of a side airbag in a vehicle seat with a side airbag device according to a first embodiment.

Hereinafter, a vehicle seat 10 with a side airbag device (hereinafter, abbreviated to a vehicle seat 10) according to an embodiment will be described with reference to FIGS. 1 to 8. Arrows FR, UP, OUT, which are appropriately described in each drawing, respectively indicate a forward direction (advancing direction), an upward direction, and an outward direction in a width direction of a vehicle. Hereinafter, in a case where descriptions are provided simply using a front-rear direction, a right-left direction, and an up-down direction, unless otherwise specified, the front-rear direction, the right-left direction, and the up-down direction respectively indicate forward and rearward in a vehicle front-rear direction, rightward and leftward in a vehicle right-left direction (vehicle-width direction), and upward and downward in a vehicle up-down direction. In each drawing, there may be cases where some reference numerals are omitted from the viewpoint of ease of viewing the drawings.

Overall Configuration of Vehicle Seat 10

First, the outline of the overall configuration of the vehicle seat 10 will be described, and thereafter the configuration of the side airbag device 50, which is a main part of the embodiment, will be described. As illustrated in FIG. 1, the vehicle seat 10 includes a seat cushion 14, a seat back 16 reclinably connected to the rear end portion of the seat cushion 14, and a headrest 18 connected to the upper end portion of the seat back 16. In the vehicle seat 10, the side airbag device 50 is mounted in a side portion (side support portion) 16A on the outside of the seat back 16 in the vehicle-width direction. The vehicle seat 10 is, for example, the driver's seat of a left-hand drive vehicle or the passenger seat of a right-hand drive vehicle, and is disposed on the left side in the vehicle cabin. A front-rear direction, a right-left direction (width direction), and an up-down direction of the vehicle seat 10 coincide with the vehicle front-rear direction, the vehicle right-left direction (width direction), and the vehicle up-down direction. In a case where the vehicle seat 10 is disposed on the right side in the vehicle cabin, the vehicle seat 10 has a configuration bilaterally symmetrical to that of the embodiment.

Figure 2:
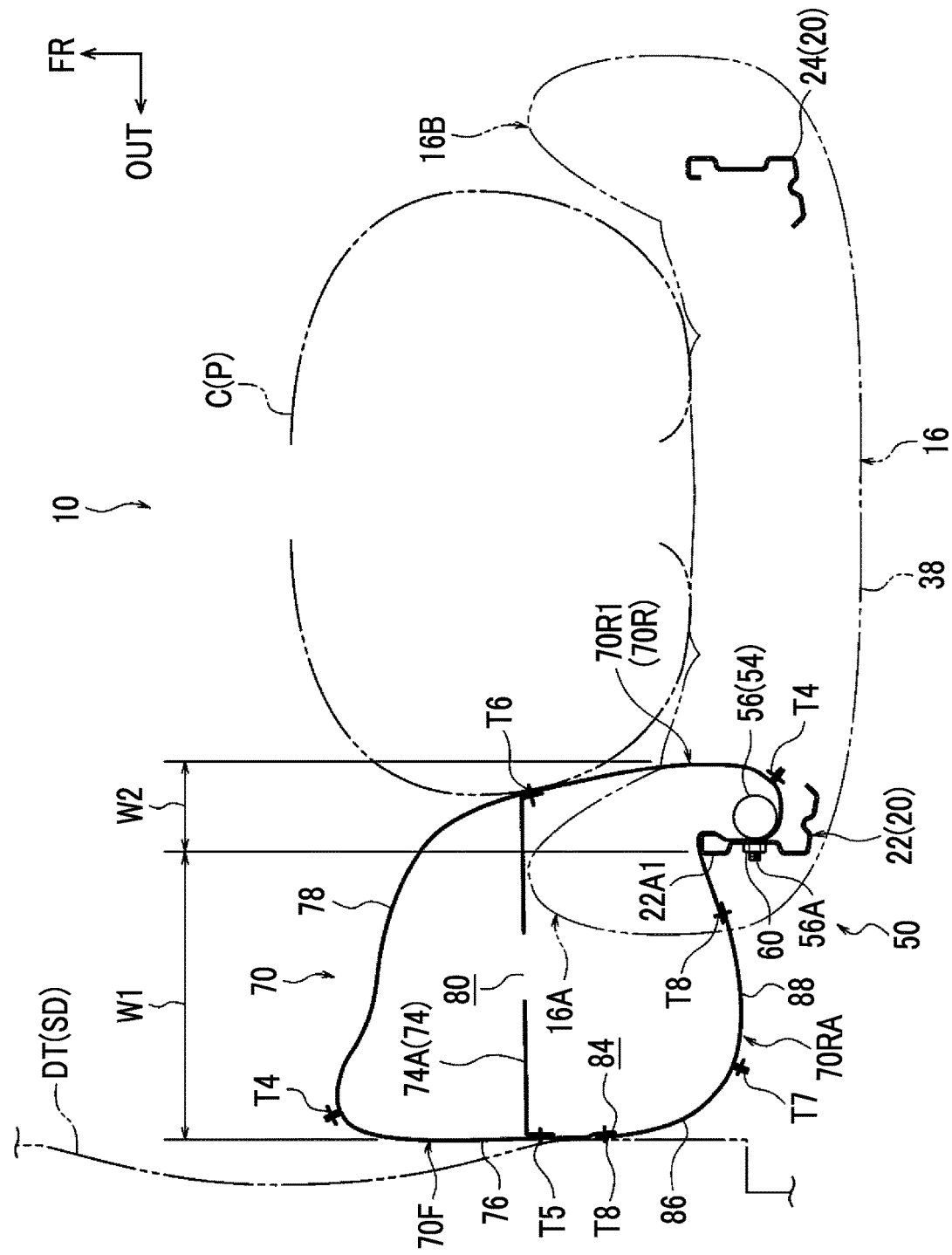
FIG. 2 is an enlarged sectional view illustrating a cut section taken along line II-II of FIG. 1, and is a view illustrating the inflated and deployed state of the side airbag according to the first embodiment.

In FIG. 1, a dummy P for a collision test is seated on the vehicle seat 10 instead of an actual occupant. In FIG. 2, a chest C of the dummy P is schematically illustrated by a two-dot chain line. The dummy P is the AM50 (the 50th percentile American male) of the World Side Impact Dummy (World SID). The dummy P is seated on the vehicle seat 10 by a seating method specified in a side collision test method. The forward and rear positions of the seat back 16 with respect to the vehicle and the inclination angle of the seat back 16 with respect to the seat cushion 14 are adjusted to reference setting positions corresponding to the above-mentioned seating method.

Six ribs R1, R2, R3, R4, R5, R6 are provided on the torso of the dummy P. There may be cases where the ribs R1, R2, R3, R4, R5, R6 are referred to as a "shoulder rib R1", an "upper chest rib R2", a "middle chest rib R3", a "lower chest rib R4", an "upper abdomen rib R5", and a "lower abdomen rib R6" in order from the top. The shoulder rib R1 is provided on a shoulder S of the dummy P. The upper chest rib R2, the middle chest rib R3, and the lower chest rib R4 are provided on the chest C of the dummy P. The upper abdomen rib R5 and the lower abdomen rib R6 are provided on an abdomen B of the dummy P. Hereinafter, there may be cases where the dummy P is referred to as a "seated occupant P".

Figure 3:
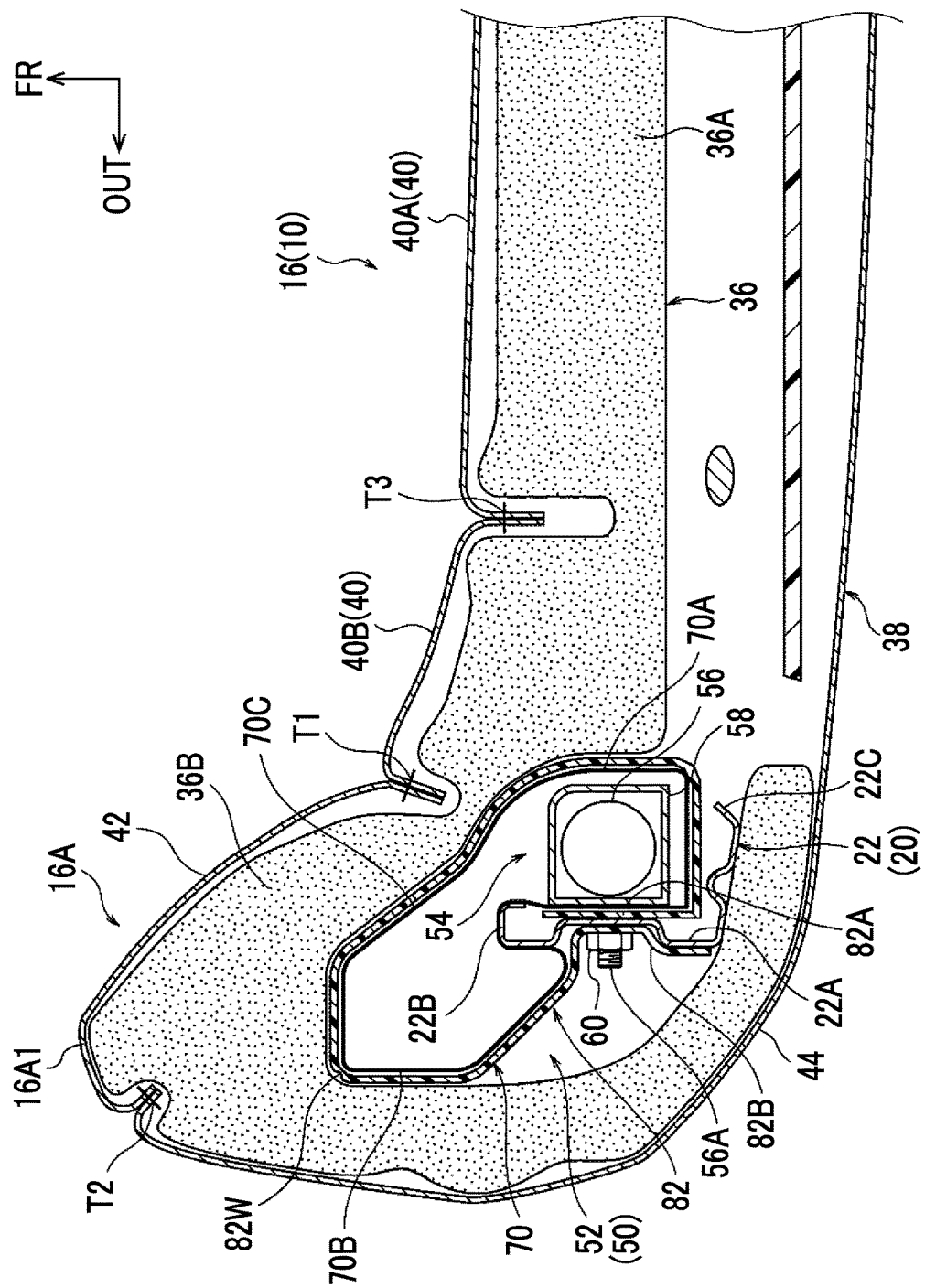
FIG. 3 is an enlarged plan sectional view illustrating a part of a seat back of the vehicle seat according to the first embodiment, and is a view illustrating a stored state of the side airbag according to the first embodiment.

As illustrated in FIGS. 1 to 3, the seat back 16 of the vehicle seat 10 includes a seat back frame 20, a seat back pad 36 (not illustrated in the figures other than FIG. 3) covering the seat back frame 20, and a seat back skin 38 covering the seat back pad 36.

The seat back frame 20 is formed of metal, for example, and forms the frame of the seat back 16. The seat back frame 20 includes an outer side frame 22 which extends in the up-down direction of the seat back 16 in the side portion 16A on the outside of the seat back 16 in the vehicle-width direction, and an inner side frame 24 which extends in the up-down direction of the seat back 16 in a side portion (side support portion) 16B on the inside of the seat back 16 in the vehicle-width direction. Furthermore, the seat back frame 20 includes an upper frame (not illustrated) which connects the upper end portions of the outer side frame 22 and the inner side frame 24 in the vehicle-width direction, and a lower frame (not illustrated) which connects the lower end portions of the outer side frame 22 and the inner side frame 24 in the vehicle-width direction. In the following description, the side portion 16A is referred to as an "outer side portion 16A".

As illustrated in FIG. 3, the outer side frame 22 includes a side wall portion 22A extending in the vehicle front-rear direction in a plan sectional view of the seat back 16, a front flange portion 22B extending from the front end of the side wall portion 22A toward the inside in the vehicle-width direction (toward the inside in a seat-width direction), and a rear flange portion 22C extending from the rear end of the side wall portion 22A toward the inside in the vehicle-width direction. The rear flange portion 22C is set to have larger dimensions in the vehicle-width direction than those of the front flange portion 22B, and the outer side frame 22 has a substantially L-shape in the plan sectional view of the seat back 16. Ribs protruding inward in the seat-width direction are formed at the center portion of the side wall portion 22A in the front-rear direction, and ribs protruding toward a seat front side are formed at the center portion of the rear flange portion 22C in the seat-width direction. The inner side frame 24 has the same configuration except that the inner side frame 24 is formed in a shape bilaterally symmetrical to the outer side frame 22.

The seat back pad 36 illustrated in FIG. 3 is formed of a foamed body such as urethane foam and forms the cushioning material of the seat back 16. The seat back pad 36 integrally includes a pad center portion 36A and a pair of right and left pad side portions 36B (the pad side portion 36B on the inside in the vehicle-width direction is not illustrated) provided on both the right and left sides of the pad center portion 36A. The pad center portion 36A is disposed on the center side of the seat back 16 in the width direction. The right and left pad side portions 36B are formed in a substantially C-shape open inward in the seat-width direction and accommodate the outer side frame 22 and the inner side frame 24 therein. The right and left pad side portion 36B protrude toward the seat front side relative to the pad center portion 36A and has a shape that ensures side support properties for the seated occupant P.

The seat back skin 38 illustrated in FIG. 3 is formed of, for example, cloth, leather, or synthetic leather and forms the skin of the seat back 16. The seat back skin 38 has a front skin 40 covering the pad center portion 36A from the seat front side, a front side skin 42 covering the pad side portion 36B from the seat front side, and a rear side skin 44 which covers the pad side portion 36B from the outside in the seat-width direction and the seat rear side and covers the pad center portion 36A from the seat rear side. The front side skin 42 is sewn to the front skin 40 at a sewn portion T1 and is sewn to the rear side skin 44 at a sewn portion T2. The sewn portion T2 of the front side skin 42 and the rear side skin 44 is positioned in the vicinity of a front edge portion 16A1 (so-called "stile portion") of the outer side portion 16A. The sewn portion T2 is configured to tear open along with the pad side portion 36B when the side airbag 70, which will be described later, inflates and deploys. In the embodiment, the front skin 40 is configured such that skin pieces 40A, 40B are sewn to each other at a sewn portion T3 positioned closer to the inside in the seat-width direction than the sewn portion T1.

Configuration of Side Airbag Device 50

As illustrated in FIGS. 1 to 3, the side airbag device 50 includes a single gas generating device 54 mounted on the inside of the outer side frame 22 in the vehicle-width direction (the center side in the vehicle-width direction), and a single side airbag 70 which receives gas from the gas generating device 54 to inflate and deploy. The gas generating device 54 and the side airbag 70 normally act as an airbag module 52 illustrated in FIG. 3, and are stored in the outer side portion 16A. The airbag module 52 is configured to include an enclosing member 82 illustrated in FIG. 3 (not illustrated in the figures other than FIG. 3).

The gas generating device 54 is constituted of a single inflator 56 and a single retainer 58 (not illustrated in the figures other than FIG. 3). The inflator 56 and the retainer 58 are disposed inward of the side wall portion 22A of the outer side frame 22 in the seat-width direction and forward of the rear flange portion 22C in the seat front-rear direction. The inflator 56 is a so-called cylinder type inflator, and is formed in a cylindrical shape. The inflator 56 is disposed in a posture in which the axial direction (longitudinal direction) of the inflator 56 is aligned with the up-down direction of the seat back 16. The retainer 58 is a member, also called a diffuser, and is formed of metal in a substantially rectangular tube shape. The retainer 58 is disposed in a posture in which the axial direction of the retainer 58 is aligned with the up-down direction of the seat back 16, and the inflator 56 is inserted into the retainer 58. The retainer 58 has a function of rectifying gas generated from the inflator 56.

A pair of upper and lower stud bolts 56A (see FIGS. 2 and 3) protrudes from the outer peripheral portion of the inflator 56 toward the outside in the seat-width direction (outside in the vehicle-width direction). The upper and lower stud bolts 56A penetrate through the retainer 58 and the side wall portion 22A and a nut 60 is screwed to the tip end side of each of the stud bolts 56A. Accordingly, the inflator 56 is fastened and fixed (so-called side-fastened) to the outer side frame 22 together with the retainer 58. The upper and lower stud bolts 56A are not limited to the configuration in which the upper and lower stud bolts 56A are provided in the inflator 56, and a configuration in which the upper and lower stud bolts 56A are provided in the retainer 58 may also be employed. In this case, for example, the inflator 56 is configured to be fixed to the retainer 58 by means of crimping or the like.

A gas ejecting portion 56B is provided at the upper end portion or the lower end portion (here, the upper end portion) of the inflator 56. The gas ejecting portion 56B is disposed at a height equal to the chest C of the seated occupant P. A plurality of gas ejecting ports (not illustrated) arranged in the peripheral direction of the inflator 56 is formed in the gas ejecting portion 56B. When the inflator 56 is activated (operated), gas is radially ejected from the plurality of gas ejecting ports. As illustrated in FIG. 1, a side collision ECU 62 mounted in the vehicle is electrically connected to the inflator 56. A side collision sensor 64 for detecting a side collision is electrically connected to the side collision ECU 62. The side collision ECU 62 is configured to activate the inflator 56 when a side collision is detected based on the output of the side collision sensor 64. For example, the side collision sensor 64 is configured to include a pressure sensor or an acceleration sensor (in-door sensor) disposed in the front side door or the rear side door, and an acceleration sensor (a sensor in the pillar) disposed in the B pillar.

In a case where a collision prediction sensor (pre-crash sensor) for predicting a side collision is electrically connected to the side collision ECU 62, the inflator 56 may be configured to be activated when the side collision ECU 62 predicts a side collision based on the signal from the collision prediction sensor. As the collision prediction sensor, for example, at least one of a millimeter-wave radar, a stereo camera, and an infrared laser capable of monitoring the front and sides of the vehicle can be applied.

On the other hand, as illustrated in FIGS. 1, 2, 4, 6, and 7, the side airbag 70 is a so-called front-rear two-chamber side airbag, and the side airbag 70 is configured to be partitioned into a front chamber 70F and a rear chamber 70R by a front-rear partition tether 74. The side airbag 70 is provided with an additional chamber 70RA that expands the rear chamber 70R. In FIG. 1, the additional chamber 70RA is schematically illustrated.

For example, outer base cloth 76 and inner base cloth 78 (reference numerals are omitted in FIG. 1) formed by cutting a nylon-based or polyester-based cloth material are overlapped with each other and the outer peripheral portions thereof are sewn (joined; same below) to each other at sewn portions T4 (not illustrated in FIG. 1) such that the side airbag 70 is formed in an elongated bag shape. In the embodiment, the outer base cloth 76 forms the outer side surface of the side airbag 70 in an inflated and deployed state in the vehicle-width direction, and the inner base cloth 78 forms the inner side surface of the side airbag 70 in the inflated and deployed state in the vehicle-width direction. The outer base cloth 76 and the inner base cloth 78 are formed to have the same size and shape.

A method of manufacturing the side airbag 70 is not limited to the above description and can be appropriately changed. For example, a configuration in which the side airbag 70 is manufactured by folding a single sheet of base cloth in half and sewing the outer peripheral portions may be employed. In addition, for example, a configuration in which the side airbag 70 is manufactured by a hollow weaving method (so-called OPW method) using an automatic loom may be employed. In the following description, the front-rear direction, the right-left direction, and the up-down directions described regarding the side airbag 70 indicate the directions in the inflated and deployed state of the side airbag 70 (in a state in which inflation and deployment of the side airbag 70 is completed), and substantially coincide with the vehicle front-rear direction, the vehicle right-left direction, and the vehicle up-down direction.

Figure 6:
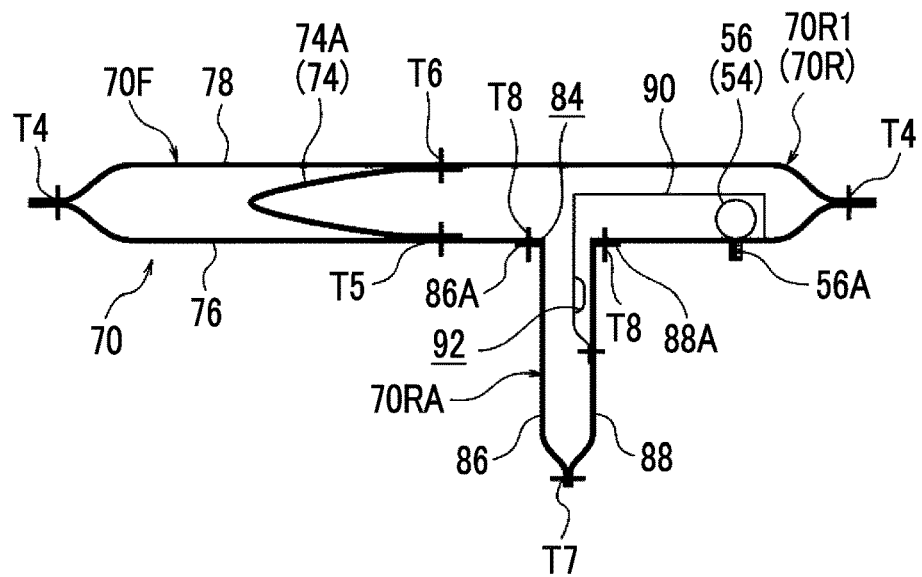
FIG. 6 is a plan sectional view illustrating a state in which the side airbag according to the first embodiment is not inflated and deployed.
Figure 7:
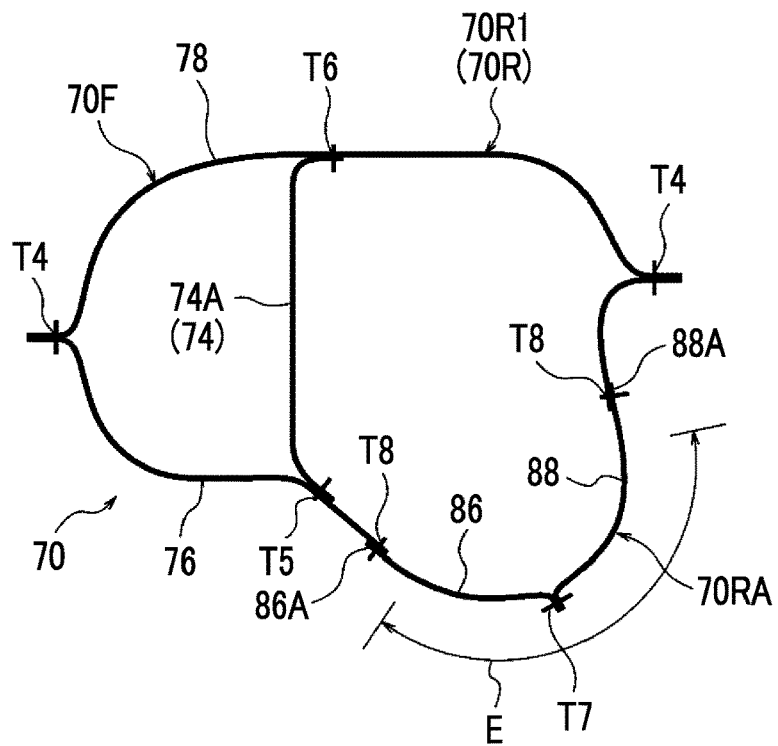
FIG. 7 is a plan sectional view illustrating the inflated and deployed state of the side airbag according to the first embodiment.

The front-rear partition tether 74 is one called a baffle, a partition wall, a partition cloth, or the like. For example, the front-rear partition tether 74 is formed by cutting the same cloth material as the outer base cloth 76 and the inner base cloth 78 into a long band shape. As illustrated in FIGS. 2, 6, and 7, a first long edge portion of the front-rear partition tether 74 is sewn to the outer base cloth 76 at a sewn portion T5 and a second long edge portion is sewn to the inner base cloth 78 at a sewn portion T6. The front-rear partition tether 74 is constituted by a front-rear partition portion 74A and an up-down partition portion 74B, and is formed in a substantially L-shape in a case where the inflated and deployed state of the side airbag 70 is viewed in the vehicle-width direction.

Specifically, the front-rear partition portion 74A extends from the upper edge portion of the side airbag 70 in the center portion of the side airbag 70 in the front-rear direction toward the lower portion side of the side airbag 70, and extends in the up-down direction of the side airbag 70. The up-down partition portion 74B extends from the lower end of the front-rear partition portion 74A toward the front edge portion side of the side airbag 70, and the front end portion of the up-down partition portion 74B reaches the front edge portion of the side airbag 70. A plurality of (here, three) communication ports 80 (see FIG. 2; not illustrated in the other figures) is formed in the front-rear partition portion 74A of the front-rear partition tether 74 so as to be arranged in the up-down direction of the side airbag 70. The front chamber 70F and the rear chamber 70R communicate with each other via the communication ports 80. The number of communication ports 80 is not limited to three and can be appropriately changed.

The gas generating device 54 described above is accommodated in the intermediate portion in the up-down direction at the rear end portion in the rear chamber 70R. The upper and lower stud bolts 56A of the inflator 56 penetrate through the rear end portion of the outer base cloth 76 and the side wall portion 22A of the outer side frame 22 and are screwed to the nuts 60. Accordingly, the side airbag 70 is fastened and fixed to the outer side frame 22 by using the inflator 56 (the gas generating device 54).

Figure 4:
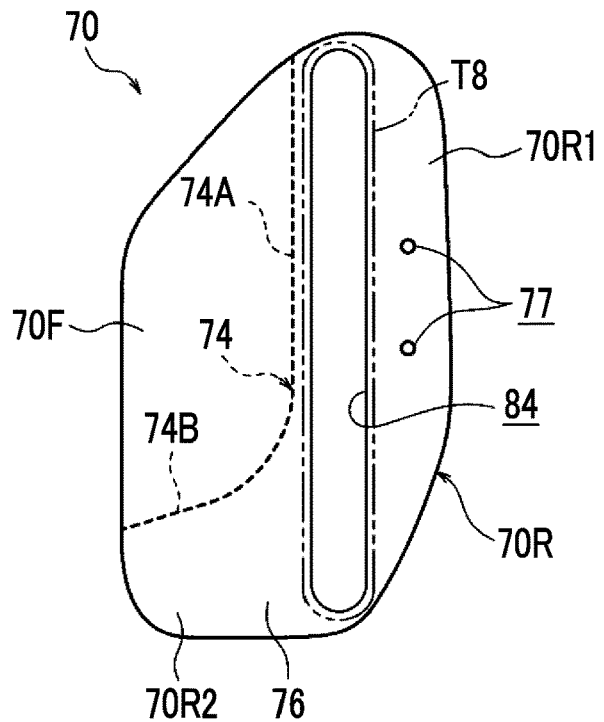
FIG. 4 is a side view illustrating a state before an additional chamber is attached to the side airbag according to the first embodiment.
Figure 5:
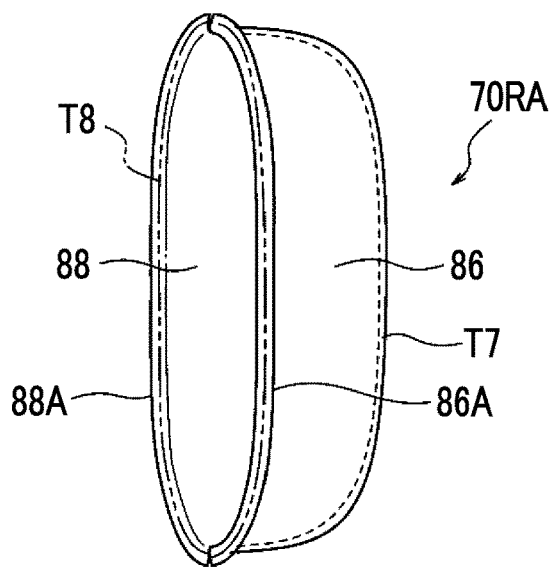
FIG. 5 is a perspective view illustrating a configuration of the additional chamber according to the first embodiment.

As illustrated in FIGS. 2, 4, 6, and 7, in the side airbag 70, a gas introduction port (opening) 84 is formed at a portion forming the front side of the rear chamber 70R in the outer base cloth 76. In FIG. 4, reference numerals 77 denote bolt insertion holes through which the stud bolts 56A of the inflator 56 are inserted. The gas introduction port 84 is formed in an elliptical shape having the up-down direction of the side airbag 70 as its major axis and extends from the upper end portion to the lower end portion of the side airbag 70. The gas introduction port 84 corresponds to the additional chamber 70RA attached to the outer base cloth 76.

As illustrated in FIGS. 2 and 5 to 7, the additional chamber 70RA has a pair of front base cloth 86 and rear base cloth 88 (reference numerals are omitted in FIG. 1) arranged in the front-rear direction of the side airbag 70. The front base cloth 86 and the rear base cloth 88 are formed of the same cloth material as the outer base cloth 76 and the like and are formed in a substantially long rectangular shape having the up-down direction of the side airbag 70 as their longitudinal direction. The outer peripheral portions of the base cloth 86, 88 excluding first end edge portions 86A, 88A (reference numerals are omitted in the figures other than FIGS. 5 to 7) are sewn to each other at a sewn portion T7, and the first end edge portions 86A, 88A are sewn (joined) to the edge portion of the gas introduction port 84 at sewn portions T8. Accordingly, the additional chamber 70RA is formed in a bag shape in which the inside thereof communicates with the inside of the rear chamber 70R, and the rear chamber 70R is configured to be expanded by the additional chamber 70RA. That is, the additional chamber 70RA can be regarded as a part of the rear chamber 70R. However, in the embodiment, for convenience of description, there may be cases where the additional chamber 70RA and the rear chamber 70R are distinguished from each other. In the embodiment, the additional chamber 70RA is formed to have a smaller capacity than the rear chamber 70R.

In the additional chamber 70RA and the rear chamber 70R, an inner tube 90 (not illustrated in the figures other than FIG. 6) is disposed in a state of extending over the inside of the additional chamber 70RA and the inside of the rear chamber 70R. For example, the inner tube 90 is formed by sewing the same cloth material as the outer base cloth 76 and the like in a tubular shape. A first end portion of the inner tube 90 disposed in the additional chamber 70RA is sewn to the rear base cloth 88. A gas ejecting port 92 which causes the inside of the inner tube 90 and the inside of the additional chamber 70RA to communicate with each other is formed at a first end side of the inner tube 90 disposed in the additional chamber 70RA. A second end side of the inner tube 90 is disposed in the rear chamber 70R, and the inner tube 90 accommodates the inflator 56 (not illustrated in FIG. 7) and the retainer 58 (not illustrated in the figures other than FIG. 3) therein.

In the side airbag 70 having the above configuration, when the inflator 56 is operated, gas generated by the inflator 56 is ejected (supplied) from the gas ejecting port 92 into the additional chamber 70RA through the inner tube 90. Accordingly, the additional chamber 70RA starts to inflate and deploy fast. A portion of the gas supplied into the additional chamber 70RA is supplied into the rear chamber 70R through the gas introduction port 84. Accordingly, the rear chamber 70R and the additional chamber 70RA start to inflate and deploy substantially simultaneously. Furthermore, the portion of the gas supplied into the rear chamber 70R is supplied to the front chamber 70F through the communication ports 80 formed in the front-rear partition portion 74A of the front-rear partition tether 74. Accordingly, the front chamber 70F starts of inflate and deploy later than the additional chamber 70RA and the rear chamber 70R. Therefore, at an initial stage of the inflation and deployment of the side airbag 70, the internal pressure of the rear chamber 70R and the additional chamber 70RA is higher than the internal pressure of the front chamber 70F.

As described above, the side airbag 70 having the above configuration and the gas generating device 54 normally act as the airbag module 52 illustrated in FIG. 3 and are stored in the outer side portion 16A. In FIG. 3, the side airbag 70 in the stored state is schematically illustrated solely by the outer shape line (outline) of the side airbag 70. The side airbag 70 in the stored state extends over the outer side frame 22 from the vehicle front side in the vehicle-width direction, and the portion including the front chamber 70F is folded outward of the outer side frame 22 in the vehicle-width direction.

That is, the side airbag 70 in the stored state is constituted by an inner storage portion 70A positioned inward of the outer side frame 22 in the vehicle-width direction together with the gas generating device 54, an outer storage portion 70B positioned outward of the outer side frame 22 in the vehicle-width direction, and a connection portion 70C which connects the inner storage portion 70A and the outer storage portion 70B on the vehicle front side of the outer side frame 22. The side airbag 70 in the stored state is mainly folded in the outer storage portion 70B. The outer storage portion 70B is folded by a folding method including any of bellows folding, roll folding, and vertical folding, or a folding method in which these are appropriately combined.

The outer storage portion 70B is disposed closer to the vehicle front side than the inner storage portion 70A and is disposed closer to the vehicle front side than the nut 60. Most of the outer storage portion 70B is positioned closer to the vehicle front side than the front flange portion 22B of the outer side frame 22. On the other hand, most of the inner storage portion 70A is positioned closer to the vehicle rear side than the front flange portion 22B. Accordingly, the airbag module 52 including the side airbag 70 in the folded state is inclined along the front side skin 42 that forms the surface of the outer side portion 16A on the seated occupant P side.

Furthermore, in the embodiment, the side airbag 70 stored in the outer side portion 16A as described above is surrounded by the enclosing member 82 (see FIG. 3, not illustrated in the other figures) in the plan sectional view of the seat back 16. The enclosing member 82 is formed of a resin or a cloth impregnated with a resin (for example, a nonwoven fabric such as felt), and is formed in a shape that surrounds the side airbag 70 in the stored state in the plan sectional view of the seat back 16. The enclosing member 82 has rigidity that can hold its own shape. The enclosing member 82 may be formed of cloth, paper, or the like.

A first end portion 82A of the enclosing member 82 is interposed between the retainer 58 and the side wall portion 22A on the inside of the outer side frame 22 in the seat-width direction. The stud bolt 56A of the inflator 56 penetrates through the first end portion 82A of the enclosing member 82. A second end portion 82B of the enclosing member 82 is disposed outward of the outer side frame 22 in the seat-width direction. The stud bolt 56A of the inflator 56 penetrates through the second end portion 82B of the enclosing member 82 and is screwed to the nut 60. Accordingly, the enclosing member 82 is locked to (here, fastened and fixed to) the outer side frame 22, and the folded state of the side airbag 70 is held by the enclosing member 82.

In the enclosing member 82, a weak portion 82W is formed in a corner section on the vehicle front side and on the outside in the vehicle-width direction. At the weak portion 82W, for example, the corner section of the enclosing member 82 is formed to be locally thin and extends in the up-down direction of the seat back 16. The weak portion 82W is configured to easily break (tear open) by the inflation pressure of the side airbag 70. As a result of the breaking, the front portion side of the enclosing member 82 is divided in the seat-width direction, and the side airbag 70 is allowed to inflate and deploy. The weak portion 82W is not limited to the corner section of the enclosing member 82 which is formed to be locally thin, and the configuration thereof can be appropriately changed. For example, a configuration in which a weak portion is formed by forming a plurality of slits, holes, or the like arranged in the up-down direction of the seat back 16 in the corner section may be employed.

In the side airbag 70 stored in the outer side portion 16A as described above, when the inflator 56 is operated, gas is supplied to each of the chambers 70F, 70R, 70RA as described above. Accordingly, the side airbag 70 is configured to inflate and deploy toward the vehicle front side of the outer side portion 16A and both sides in the vehicle-width direction as illustrated in FIGS. 1 and 2 and be interposed between the seated occupant P and a vehicle cabin side portion (here, a door trim DT of a front side door SD illustrated in FIG. 2). Hereinafter, the side airbag 70 in the inflated and deployed state will be described.

As illustrated in FIG. 1, the side airbag 70 is formed to inflate and deploy in the up-down direction of the seat back 16 as its longitudinal direction and restrain the chest C, the abdomen B, and the waist L of the seated occupant P from the outside in the vehicle-width direction. In the inflated and deployed state of the side airbag 70, the front-rear partition portion 74A of the front-rear partition tether 74 extends in the up-down direction of the seat back 16 along the front edge portion 16A1 of the outer side portion 16A and faces the center portions of the chest C and the abdomen B of the seated occupant P in the front-rear direction. As illustrated in FIG. 2, the front-rear partition portion 74A is attached to the outer base cloth 76 and the inner base cloth 78 to extend in the vehicle-width direction (to be disposed perpendicular or substantially perpendicular to the vehicle front-rear direction) in a case where the inflated and deployed state of the side airbag 70 is viewed in the plan sectional view.

The up-down partition portion 74B of the front-rear partition tether 74 extends from the lower end of the front-rear partition portion 74A toward the vehicle front side along the waist of the seated occupant P. Accordingly, the front chamber 70F separated from the rear chamber 70R by the front-rear partition portion 74A and the up-down partition portion 74B is configured to restrain the front portions of the chest C and the abdomen B of the seated occupant P, and the rear chamber 70R is configured to restrain the rear portions of the chest C and the abdomen B and the front portion and the rear portion of the waist L.

Supplementally, the rear chamber 70R has a chest-abdomen restraint portion 70R1 for restraining the rear portions of the chest C and the abdomen B and a waist restraint portion 70R2 for restraining the front portion and the rear portion of the waist L and is formed in a substantially L-shape in a case where the inflated and deployed state is viewed in the vehicle-width direction. The chest-abdomen restraint portion 70R1 inflates and deploys primarily within the outer side portion 16A on the vehicle rear side of the front chamber 70F and restrains portions from the upper end portion of the rear portion of the chest C to the lower end portion of the rear portion of the abdomen B. The rear portion side of the waist restraint portion 70R2 which restrains the rear portion of the waist L inflates and deploys within the outer side portion 16A, and the front portion side of the waist restraint portion 70R2 which restrains the front portion of the waist L inflates and deploys toward the vehicle front side relative to the outer side portion 16A along with the front chamber 70F. The front portion side of the waist restraint portion 70R2 is separated from the front chamber 70F by the up-down partition portion 74B and inflates and deploys toward the vehicle lower side of the front chamber 70F. The up-down partition portion 74B is inclined so as to gradually descend toward the vehicle front side in the inflated and deployed state of the side airbag 70. In addition, the lower edge portion of the rear chamber 70R is inclined so as to gradually ascend toward the vehicle front side. Accordingly, the front portion side (the portion for restraining the front portion of the waist L) of the waist restraint portion 70R2 in the state in which inflation and deployment is completed is formed such that the dimensions in the vehicle up-down direction decrease toward the vehicle front side.

In the embodiment, as illustrated in FIG. 1, the upper surface of the side airbag 70 in the state in which inflation and deployment is completed is configured to serve as an inclined surface 70U having a descending gradient toward the vehicle front side. Specifically, the entire upper surface of the front chamber 70F in the state in which inflation and deployment is completed and the front portion side of the upper surface of the chest-abdomen restraint portion 70R1 in the state in which inflation and deployment is completed serve as the continuous inclined surface 70U having a descending gradient toward the vehicle front side. The inclined surface 70U presses an upper arm A of the seated occupant P from the vehicle rear side when the side airbag 70 inflates and deploys. Accordingly, a configuration in which the upper arm A is pushed upward by the inclined surface 70U toward the vehicle upper side (see the upper arm A indicated by the two-dot chain line in FIG. 1) is achieved.

In the embodiment, as illustrated in FIG. 2, the front chamber 70F and the rear chamber 70R of the side airbag 70 inflate and deploy in a state of extending over the outer side frame 22 from the vehicle front side in the vehicle-width direction. In addition, the additional chamber 70RA attached to the outer base cloth 76 inflates and deploys toward the outside of the rear chamber 70R in the vehicle-width direction and the vehicle rear side. Since the additional chamber 70RA is provided, an inflation width (bag width; inflation range) of the side airbag 70 in the vehicle-width direction is set to be greater, in the vehicle-width direction, outside a side surface 22A1 provided on the outside of the side wall portion 22A of the outer side frame 22 in the vehicle-width direction than inside the side surface 22A1 in the vehicle-width direction. That is, the side airbag 70 is configured such that an inflation width W1 (see FIG. 2) outside the side surface 22A1 in the vehicle-width direction is greater than an inflation width W2 (see FIG. 2) inside the side surface 22A1 in the vehicle-width direction (W1>W2). The side surface 22A1 is an example of "a side surface of an outer side of an outer side frame in a vehicle-width direction". Hereinafter, the side surface 22A1 is referred to as "outer side surface 22A1".

The inflation width W1 is set to be equal to or greater than the dimension of the gap between the outer side frame 22 and the door trim DT in the vehicle-width direction. Accordingly, even in a state before the front side door SD intrudes toward the inside (the inside of the vehicle cabin) in the vehicle-width direction due to the collision load of a side collision, the inflated and deployed side airbag 70 (here, the rear chamber 70R including the additional chamber 70RA) is configured to come into contact with the door trim DT. FIG. 2 illustrates a state during the inflation and deployment (the initial state of inflation and deployment) of the side airbag 70 in a case where the side airbag 70 is caused to inflate and deploy in a normal state in which no side collision has occurred. In FIG. 2, the state in which the side airbag 70 is in contact with the seated occupant P is illustrated. However, the side airbag 70 is not deformed by the load from the seated occupant P. The described point is applied to FIGS. 8, 9, 14, 18, 21, and 27 in the same manner.

In the embodiment, as illustrated in FIG. 2, the additional chamber 70RA and the rear chamber 70R inflate and deploy to form a single bag body in the plan sectional view. In the inflated and deployed state, the peripheral length of the portion of the outer base cloth 76 forming the rear chamber 70R in the plan sectional view is extended by the front base cloth 86 and the rear base cloth 88 of the additional chamber 70RA (see the arrow E in FIG. 7). As a result, the inflation range of the rear chamber 70R including the additional chamber 70RA is expanded toward the outside in the vehicle-width direction and the vehicle rear side such that the contact area between the rear chamber 70R and the door trim DT is expanded. That is, the front base cloth 86 and the rear base cloth 88 of the additional chamber 70RA can be regarded as excess length portions that increase the peripheral length of the outer base cloth 76 (portions of the outer side of the base cloth of the side airbag in the inflated and deployed state in the vehicle-width direction) of the side airbag 70.

Operation and Effects

Next, the operation and effects of the embodiment will be described.

In the vehicle seat 10 having the above configuration, when the side collision ECU 62 detects a side collision of the vehicle based on the output of the side collision sensor 64, the inflator 56 attached to the inside of the outer side frame 22 in the vehicle-width direction is operated. Gas generated by the inflator 56 is supplied into the additional chamber 70RA through the inner tube 90, is supplied into the rear chamber 70R through the gas introduction port 84, and is further supplied into the front chamber 70F through the communication ports 80 of the front-rear partition portion 74A. Accordingly, the side airbag 70 inflates and deploys in the state of extending over the outer side frame 22 from the vehicle front side in the vehicle-width direction.

In the inflated and deployed side airbag 70, the rear chamber 70R receives a reaction force from the outer side frame 22 and restrains the seated occupant P fast (presses the seated occupant P toward the inside in the vehicle-width direction). Furthermore, in the side airbag 70, the additional chamber 70RA attached to the outer base cloth 76 inflates and deploys toward the outside of the rear chamber 70R in the vehicle-width direction. Accordingly, the inflation width of the side airbag 70 in the vehicle-width direction is greater outside the outer side surface 22A1 of the outer side frame 22 in the vehicle-width direction than inside the outer side surface 22A1 in the vehicle-width direction. As a result, the inflated and deployed side airbag 70 comes into contact with the door trim DT of the front side door SD fast, and a reaction force from the door trim DT in addition to the reaction force from the outer side frame 22 is applied to the side airbag 70 fast. Accordingly, the initial occupant restraint performance of the side airbag 70 can be further improved.

That is, since the inflated and deployed side airbag 70 receives the reaction force from the door trim DT fast as well as from the outer side frame 22, a temporary decrease in the pressing force toward the inside in the vehicle-width direction to be applied to the seated occupant P from the side airbag 70 at the initial stage of inflation and deployment of the side airbag 70 is prevented or suppressed. As a result, it becomes possible to effectively apply a speed toward the inside in the vehicle-width direction to the seated occupant P, and thus so-called ride-down effect can be enhanced, thereby improving the protection performance for the seated occupant P. At a later stage of the side collision, the side airbag 70 is compressed in the vehicle-width direction between the door trim DT intruding toward the inside in the vehicle-width direction and the seated occupant P and the side airbag 70 is thus deformed such that the front portion side of the side airbag 70 protrudes toward the vehicle front side. Therefore, even in the configuration in which the side airbag 70 easily inflates and deploys to a sufficiently large extent outward of the outer side surface 22A1 in the vehicle-width direction (easily inflates in the vehicle-width direction), the side airbag 70 can restrain the seated occupant P as in the side airbag of the related art.

Figure 8:
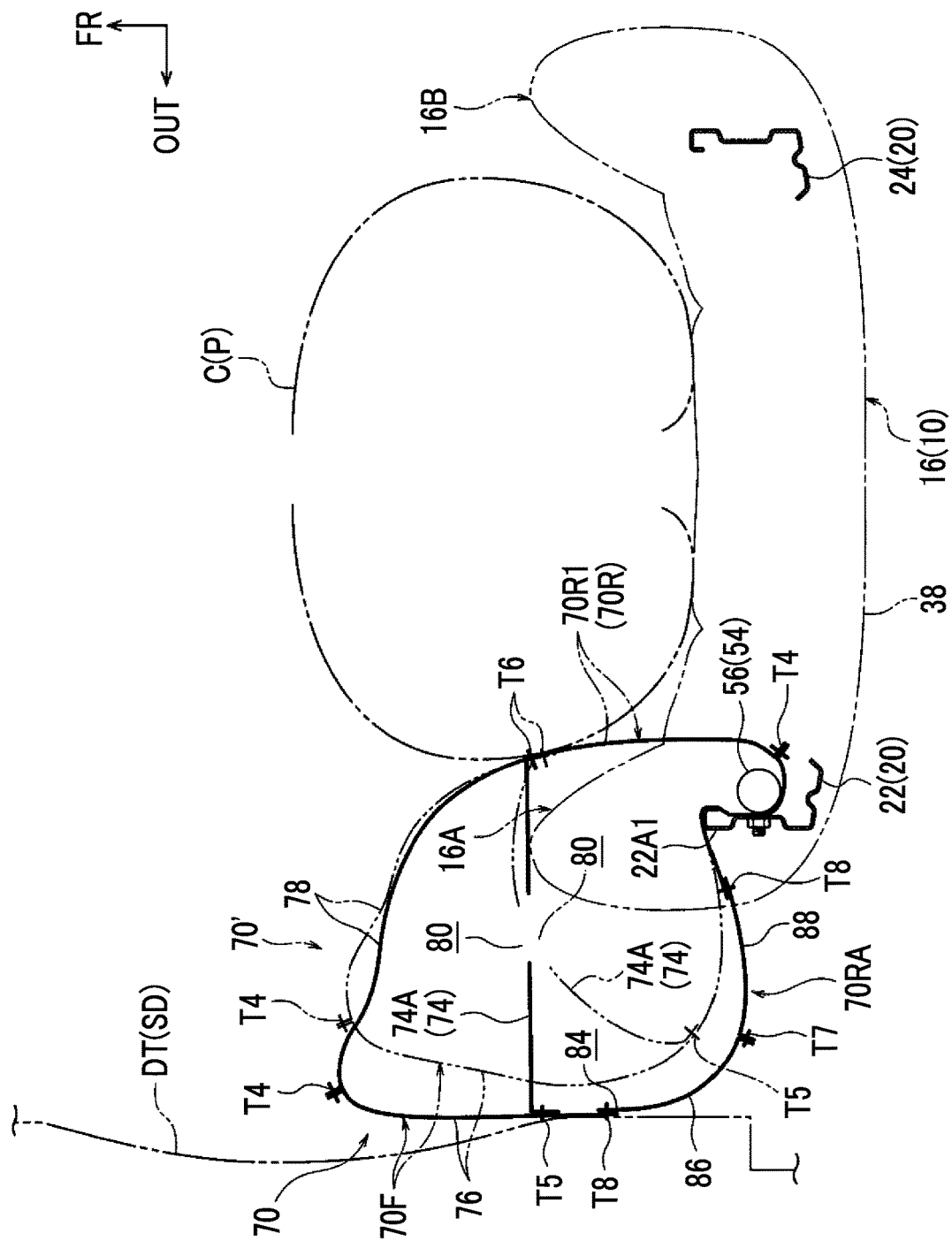
FIG. 8 is a sectional view for describing a side airbag according to a comparative example, corresponding to FIG. 2.

Here, supplementary description for the effects of the embodiment will be provided using a side airbag 70' (comparative example) indicated by the two-dot chain line in FIG. 8. The side airbag 70' does not have the additional chamber 70RA and the gas introduction port 84 according to the embodiment. However, the other configurations thereof are the same as those of the side airbag 70 (see the solid line in FIG. 8) according to the embodiment. In FIG. 8, like configurations in the side airbag 70' which are similar to those of the side airbag 70 are denoted by like reference numerals.

As in the embodiment, the side airbag 70' inflates and deploys by receiving gas from the inflator 56 attached to the inside of the outer side frame 22 in the vehicle-width direction. Furthermore, as in the embodiment, the front chamber 70F and the rear chamber 70R are partitioned by the front-rear partition tether 74 and the front chamber 70F inflates and deploys later than the rear chamber 70R. Therefore, in the side airbag 70', the inflation and deployment toward the outside in the vehicle-width direction is delayed, and it is difficult for the side airbag 70' to come into contact with the door trim DT of the front side door SD fast (see the two-dot chain line in FIG. 8). As a result, the input of the reaction force from the door trim DT to the side airbag 70' is delayed, and the pressing force toward the inside in the vehicle-width direction to be applied to the seated occupant P from the side airbag 70' is temporarily decreased at the initial stage of inflation and deployment of the side airbag 70'.

The point described above is that, in the embodiment, the inflation width of the side airbag 70 (particularly the rear chamber 70R) in the vehicle-width direction is expanded outward of the outer side frame 22 in the vehicle-width direction and thus the side airbag 70 easily inflates and deploys toward the outside in the vehicle-width direction. Therefore, the deployment speed of the side airbag 70 toward the outside in the vehicle-width direction increases, and the side airbag 70 comes into contact with the door trim DT fast. Accordingly, the decrease in the pressing force described above is prevented or effectively suppressed.

As illustrated in FIG. 8, the side airbag 70' inflates and deploys while being inclined obliquely toward the outside in the vehicle-width direction, and thus the front-rear partition portion 74A is inclined obliquely with respect to the vehicle-width direction. As a result, a portion of the front chamber 70F having a lower pressure than the rear chamber is interposed between the rear chamber 70R having a higher pressure than the front chamber and the door trim DT and the reaction force received by the rear chamber 70R from the door trim DT decreases. Therefore, the seated occupant P cannot be effectively pressed toward the inside in the vehicle-width direction by the rear chamber 70R.

The point described above is that in the embodiment, as indicated by the solid line in FIG. 8, when the side airbag 70 inflates and deploys, the peripheral length of the portion of the outer base cloth 76 forming the rear chamber 70R in the plan sectional view is extended by the front base cloth 86 and the rear base cloth 88 of the additional chamber 70RA. Accordingly, in the inflated and deployed state of the side airbag 70, it is easy to set the front-rear partition portion 74A to extend in the vehicle-width direction in the plan sectional view of the front-rear partition portion 74A. As a result, a portion of the front chamber 70F having a lower pressure than the rear chamber is prevented from being interposed between the rear chamber 70R having a higher pressure than the front chamber and the door trim DT and it becomes possible to effectively press the seated occupant P toward the inside in the vehicle-width direction by the rear chamber 70R.

As described above, in the embodiment, in the configuration in which the gas generating device 54 is attached to the inside of the outer side frame 22 in the vehicle-width direction in the seat back 16, the initial occupant restraint performance of the side airbag 70 can be further improved. In the embodiment, since the additional chamber 70RA is configured to be attached to the outer base cloth 76 of the side airbag 70, the side airbag 70 can be caused to inflate and deploy to a sufficiently large extent toward the outside in the vehicle-width direction with a simple configuration. Furthermore, since a simple configuration in which the first end edge portions 86A, 88A of the front base cloth 86 and the rear base cloth 88 of the additional chamber 70RA are sewn to the edge portion of the gas introduction port 84 and the outer peripheral portions of the front base cloth 86 and the rear base cloth 88 excluding first end edge portions 86A, 88A are sewn to each other is achieved, the manufacturing of the additional chamber 70RA is easy.

In the embodiment, as illustrated in FIG. 3, the side airbag 70 is stored in the outer side portion 16A in a state in which the side airbag 70 extends over the outer side frame 22 from the vehicle front side in the vehicle-width direction and the portion including the front chamber 70F is folded outward of the outer side frame 22 in the vehicle-width direction (on the opposite side of the outer side frame 22 from the seated occupant P). Accordingly, mounting of the side airbag 70 in the seat back 16 which is set to have a relatively narrow gap between the outer side frame 22 and the seated occupant P is facilitated.

Furthermore, in the embodiment, the front chamber 70F in the state in which inflation and deployment is completed restrains the front portions of the chest C and the abdomen B of the seated occupant P. The rear chamber 70R in the state in which inflation and deployment is completed restrains the rear portions of the chest C and the abdomen B of the seated occupant P and the front portion and the rear portion of the waist L of the seated occupant P. That is, the rear chamber 70R which inflates and deploys faster at a higher pressure than the front chamber 70F while receiving a reaction force toward the inside in the vehicle-width direction from the outer side frame 22 restrains (presses toward the inside in the vehicle-width direction) a wide range from the chest C to the waist L of the seated occupant P. Accordingly, a pressing force toward the inside in the vehicle-width direction is easily exerted on the center of gravity of the seated occupant (dummy) P. Moreover, since the rear chamber 70R presses the front portion and the rear portion of the waist L of the seated occupant P, compared to a case where the rear portion of the waist L is solely pressed by the rear chamber, the pressing direction of the waist L is likely to follow the vehicle-width direction. From the above description, it becomes possible to effectively move the seated occupant P toward the inside in the vehicle-width direction.

In the embodiment, the enclosing member 82 locked to the outer side frame 22 normally surrounds the side airbag 70 stored in the outer side portion 16A in the plan sectional view of the seat back 16. Accordingly, the portion including the front chamber 70F side in the side airbag 70 in the stored state, that is, the outer storage portion 70B folded outward of the outer side frame 22 in the vehicle-width direction, can be held in the folded state with a simple configuration. Moreover, since the weak portion 82W which breaks by the inflation pressure of the side airbag 70 is formed in the enclosing member 82, it is possible to allow the side airbag 70 to inflate and deploy with a simple configuration.

In addition, since the enclosing member 82 is formed of a resin or a cloth impregnated with a resin, compared to a case where the enclosing member 82 is formed of a cloth, paper, or the like, the folded state of the side airbag 70 can be firmly held. In addition, since the folded state of the side airbag 70 can be held by the enclosing member 82 before the airbag module 52 is assembled to the outer side frame 22, the assembly of the airbag module 52 to the outer side frame 22 is improved. Furthermore, since it is difficult for the load from the seated occupant P in the normal state to be applied to the side airbag 70 in the stored state, the folded state of the side airbag 70 can be maintained in the initial state of assembly over a long period of time.

In the embodiment, as illustrated in FIG. 3, in the side airbag 70 stored in the outer side portion 16A, the outer storage portion 70B positioned outward of the outer side frame 22 in the vehicle-width direction is disposed to be biased toward the vehicle front side from the inner storage portion 70A positioned inward of the outer side frame 22 in the vehicle-width direction. Accordingly, the outer storage portion 70B of the side airbag 70, that is, the portion folded outward of the outer side frame 22 in the vehicle-width direction easily inflate and deploy toward the vehicle front side. Furthermore, since the side airbag 70 in the stored state has an outer shape along the surface of the outer side portion 16A on the seated occupant P side in the plan sectional view of the seat back 16, the mountability of the side airbag 70 in the seat back 16 which is set to have a relatively narrow gap between the outer side frame 22 and the seated occupant P is not deteriorated. Moreover, since the outer storage portion 70B is positioned closer to the vehicle front side than the nut 60, the outer storage portion 70B does not become an obstacle when the inflator 56 is fastened and fixed to the outer side frame 22.

In the embodiment, the upper surface of the side airbag 70 in the state in which inflation and deployment is completed becomes the inclined surface 70U having a descending gradient toward the vehicle front side. The inclined surface 70U presses the upper arm A of the seated occupant P from the vehicle rear side such that the upper arm A can be pushed toward the upper side of the vehicle. As a result, it is difficult for the upper arm A to be interposed between the chest C of the seated occupant P and the side airbag 70 and thus, the chest C is less likely to receive the load from the upper arm A.

Furthermore, in the embodiment, the front portion side of the waist restraint portion 70R2 provided in the rear chamber 70R inflates and deploys into a shape in which the dimensions in the vehicle up-down direction decrease toward the vehicle front side. Therefore, in a case where the rear chamber 70R having a higher pressure than the front chamber inflates and deploys in a state in which the occupant is positioned at an inappropriate position (out of position (OOP)) on the front side of the vehicle in the outer side portion 16A, the load applied to the occupant can be reduced. Therefore, so-called OOP performance can be improved.

Next, other embodiments will be described. The same configurations and actions as those of the first embodiment are denoted by the same reference numerals as those of the first embodiment, and the description thereof will be omitted. In FIGS. 9 to 28 used for the following description, there may be cases where some reference numerals are omitted from the viewpoint of ease of illustration of the drawings.

Second Embodiment

Figure 9:
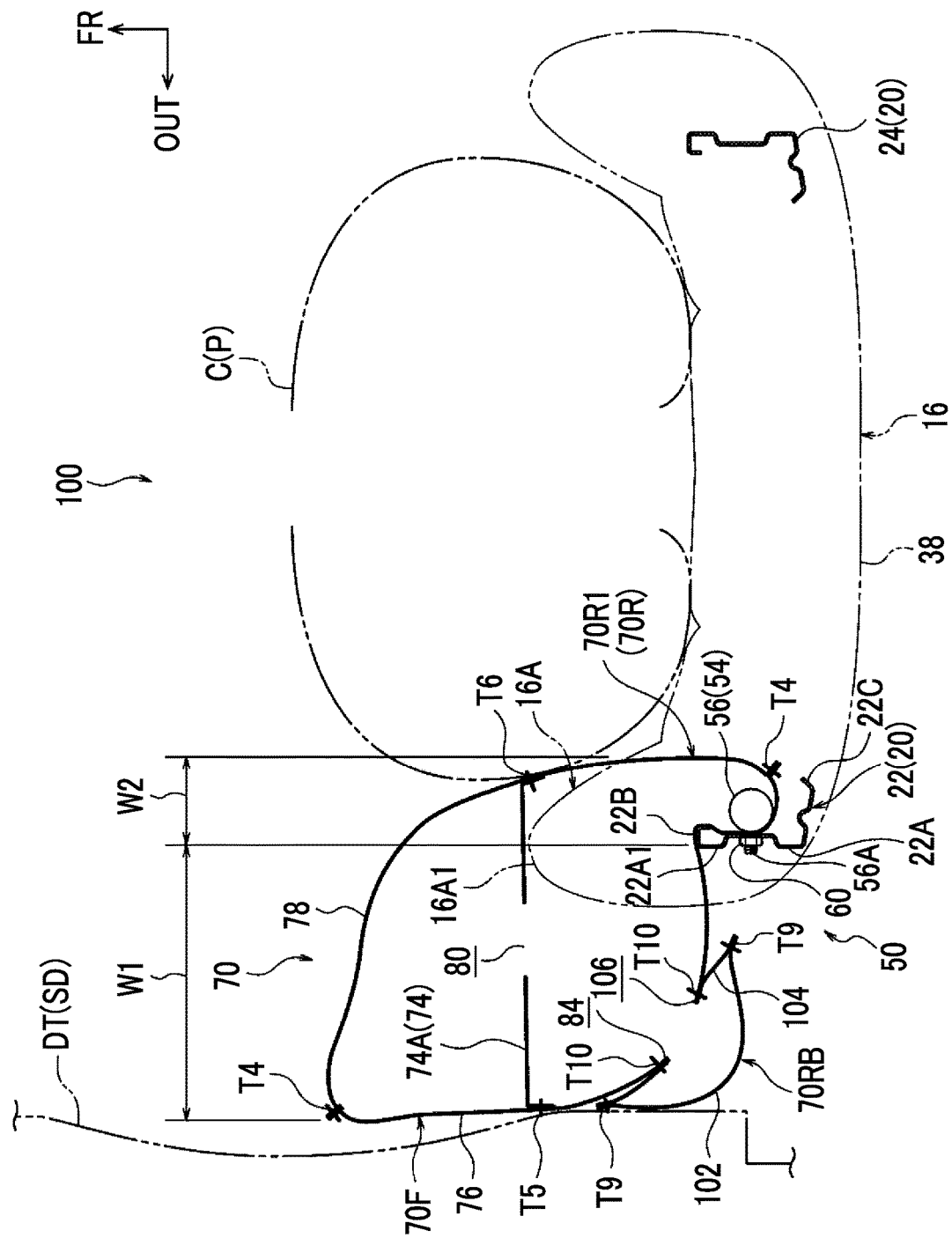
FIG. 9 is a plan sectional view illustrating an inflated and deployed state of a side airbag in a vehicle seat with a side airbag device according to a second embodiment.
Figure 10:
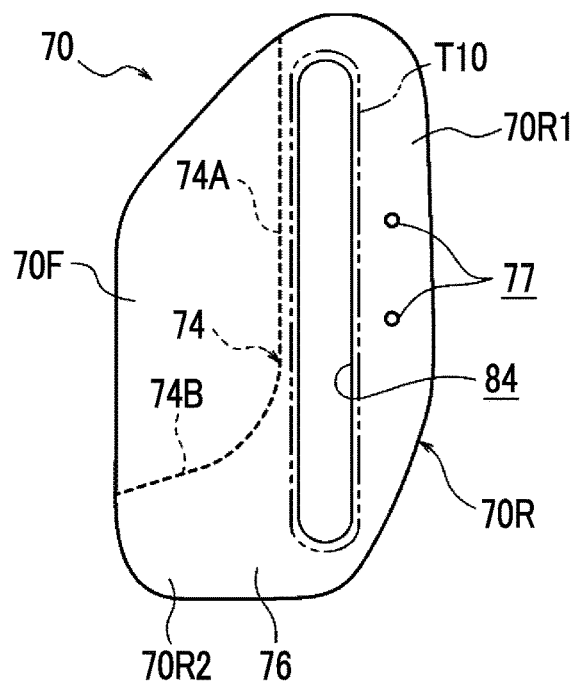
FIG. 10 is a sectional view illustrating a state before an additional chamber is attached to the side airbag according to the second embodiment.
Figure 11:
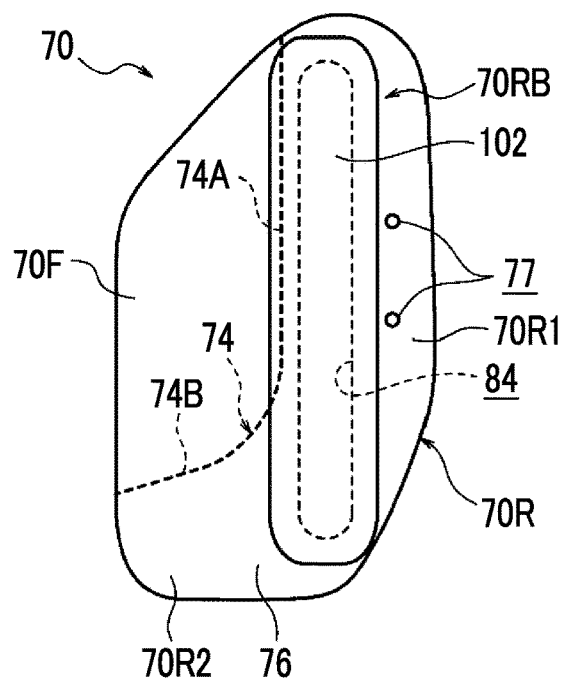
FIG. 11 is a side view of the side airbag according to the second embodiment.
Figure 12:
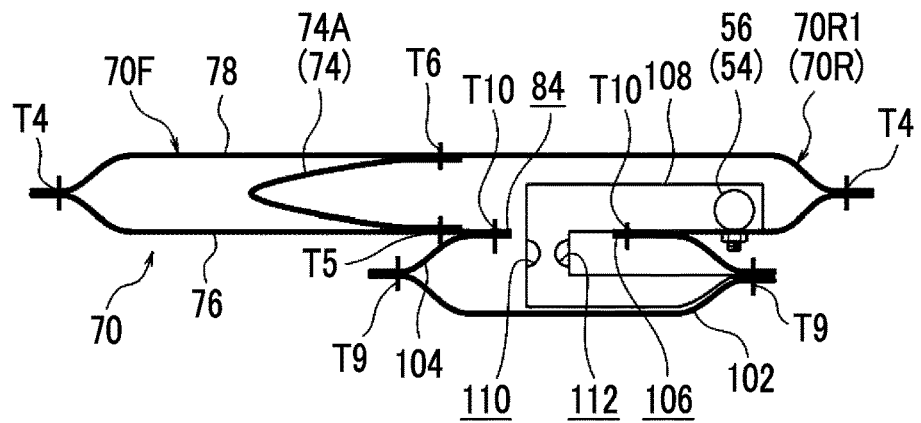
FIG. 12 is a plan sectional view illustrating a state in which the side airbag according to the second embodiment is not inflated and deployed.

FIG. 9 is a plan sectional view illustrating the inflated and deployed state of the side airbag 70 in the vehicle seat 100 provided with a side airbag device according to a second embodiment. The second embodiment has basically the same configuration as the first embodiment, but an additional chamber 70RB provided in the side airbag 70 is different from the additional chamber 70RA according to the first embodiment.

As illustrated in FIGS. 9 and 11 to 13, the additional chamber 70RB has a pair of right base cloth 104 and left base cloth 102 arranged in the right-left direction (thickness direction; width direction) of the side airbag 70. The right base cloth 104 and the left base cloth 102 are formed of the same cloth material as the outer base cloth 76 and the like and are formed in a substantially long rectangular shape having the up-down direction of the side airbag 70 as their longitudinal direction. The outer peripheral portions of the base cloth 104, 102 are sewn to each other at sewn portion T9 (not illustrated in FIG. 11). Accordingly, the additional chamber 70RB is formed in an elongated bag shape having the up-down direction of the side airbag 70 as its longitudinal direction. The additional chamber 70RB is formed to have a smaller capacity than the rear chamber 70R.

In the right base cloth 104 of the right base cloth 104 and the left base cloth 102, which is in contact with the outer base cloth 76, a gas introduction port 106 is formed at a position overlapping the gas introduction port 84 formed in the outer base cloth 76. Like the gas introduction port 84, the gas introduction port 106 is formed in an elliptical shape having the up-down direction of the side airbag 70 as its major axis and is formed to overlap the gas introduction port 84. In addition, the edge portion of the gas introduction port 106 in the right base cloth 104 and the edge portion of the gas introduction port 84 in the outer base cloth 76 are sewn to each other at sewn portions T10. Accordingly, the additional chamber 70RB is attached to the portion of the outer base cloth 76 forming the front portion side of the rear chamber 70R. The inside of the additional chamber 70RB communicates with the inside of the rear chamber 70R via the gas introduction ports 84, 106 and the rear chamber 70R is configured to be expanded by the additional chamber 70RB. Like the additional chamber 70RA, the additional chamber 70RB can be regarded as a part of the rear chamber 70R. However, in the embodiment, for convenience of description, there may be cases where the additional chamber 70RB and the rear chamber 70R are distinguished from each other.

In the additional chamber 70RB and the rear chamber 70R, an inner tube 108 (not illustrated in the figures other than FIG. 12) is disposed in a state of extending over the inside of the additional chamber 70RB and the inside of the rear chamber 70R. For example, the inner tube 108 is formed by sewing the same cloth material as the outer base cloth 76 and the like in a tubular shape. The inner tube 108 disposed in the additional chamber 70RB extends toward the rear end side of the additional chamber 70RB and is sewn together to the rear end portion of the additional chamber 70RB at sewn portions T9. In a first end side (intermediate portion) of the inner tube 108 disposed in the additional chamber 70RB, a pair of front and rear gas ejecting ports 110, 112 which cause the inside of the inner tube 108 and the inside of the additional chamber 70RB to communicate with each other are formed. A second end side of the inner tube 108 is disposed in the rear chamber 70R and accommodates the inflator 56 (not illustrated in FIG. 13) and the retainer 58 (see FIG. 3: not illustrated in the other figures) therein.

In the side airbag 70 having the above configuration, when the inflator 56 is operated, gas generated by the inflator 56 is ejected from the front and rear gas ejecting ports 110, 112 toward the front and rear sides of the additional chamber 70RB through the inner tube 108, is supplied into the rear chamber 70R through the gas introduction ports 84, 106, and is further supplied into the front chamber 70F through the communication ports 80 of the front-rear partition portion 74A. Accordingly, the side airbag 70 inflates and deploys in a state of extending over the outer side frame 22 from the vehicle front side in the vehicle-width direction and the additional chamber 70RB inflates and deploys toward the outside of the rear chamber 70R in the vehicle-width direction. Accordingly, the inflation width of the side airbag 70 in the vehicle-width direction is set to be greater outside the outer side surface 22A1 of the outer side frame 22 in the vehicle-width direction than inside the outer side surface 22A1 in the vehicle-width direction.

Figure 13:
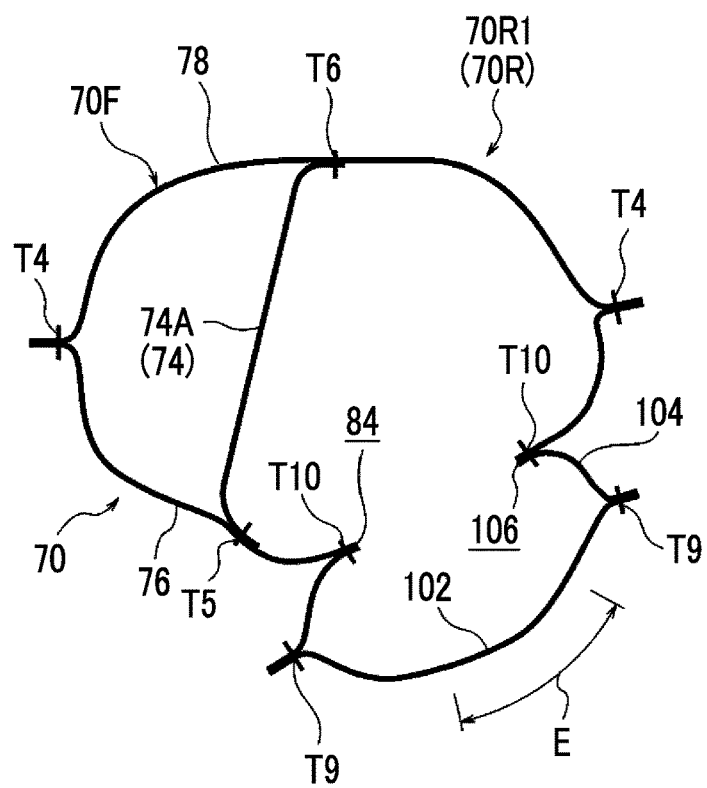
FIG. 13 is a plan sectional view illustrating the inflated and deployed state of the side airbag according to the second embodiment.

In the inflated and deployed state, the peripheral length of the portion of the outer base cloth 76 forming the rear chamber 70R in the plan sectional view is extended by the right base cloth 104 and the left base cloth 102 of the additional chamber 70RB (see the arrow E in FIG. 13). As a result, the inflation range of the rear chamber 70R including the additional chamber 70RB is expanded toward the outside in the vehicle-width direction and the vehicle rear side such that the contact area between the rear chamber 70R and the door trim DT is expanded.

Also in the second embodiment, basically the same actions and effects as the first embodiment can be obtained. Moreover, in the second embodiment, since the edge portion of the gas introduction port 106 formed in the right base cloth 104 of the right base cloth 104 and the left base cloth 102 is configured to be sewn to the edge portion of the gas introduction port 84 formed in the outer base cloth 76 of the side airbag 70, compared to the first embodiment, the inflation width of the additional chamber 70RB in the vehicle-width direction is easily secured. Therefore, it is easy to partially increase the energy absorption stroke of the side airbag 70.

Third Embodiment

Figure 14:
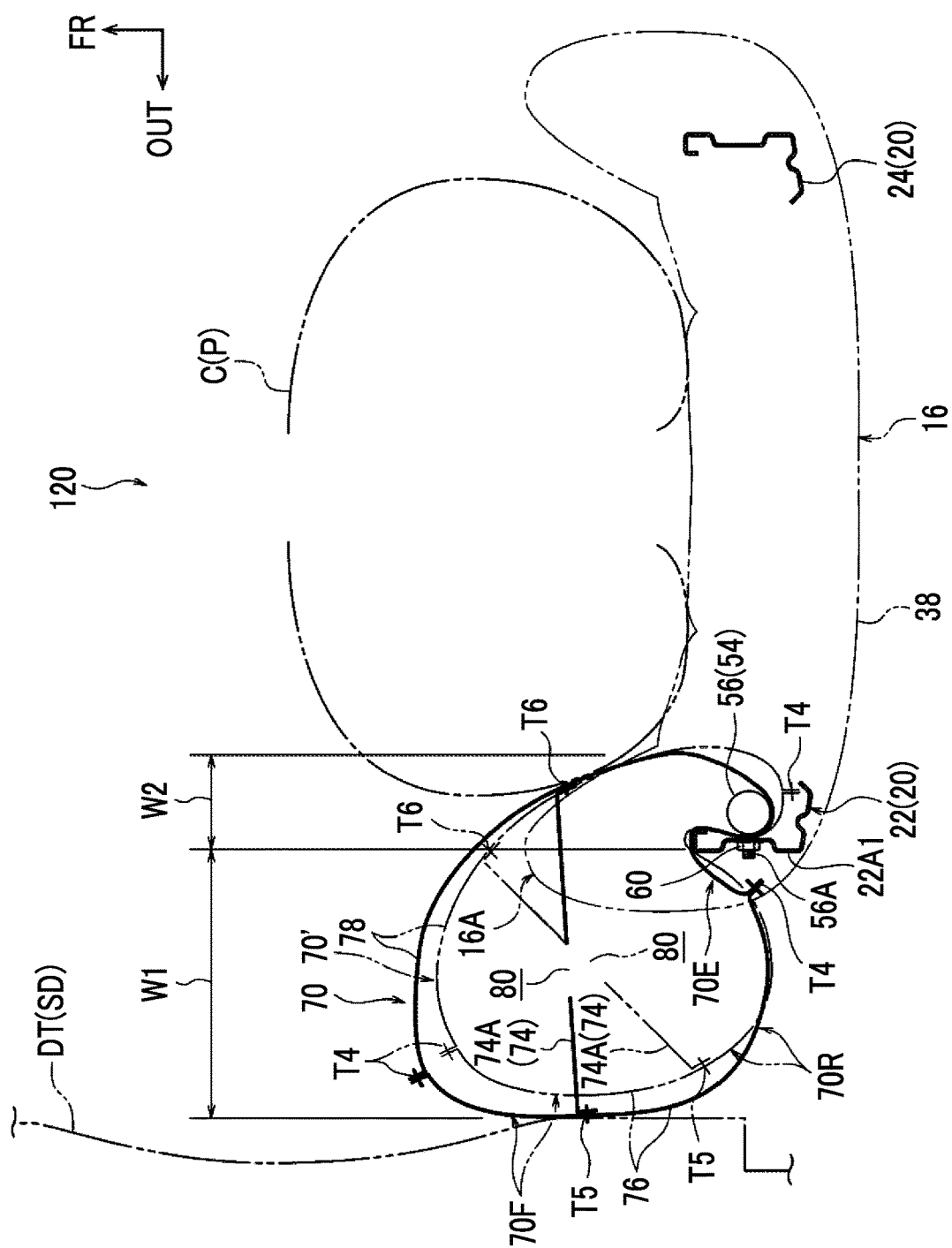
FIG. 14 is a plan sectional view illustrating an inflated and deployed state of a side airbag in a vehicle seat with a side airbag device according to a third embodiment.
Figure 15:
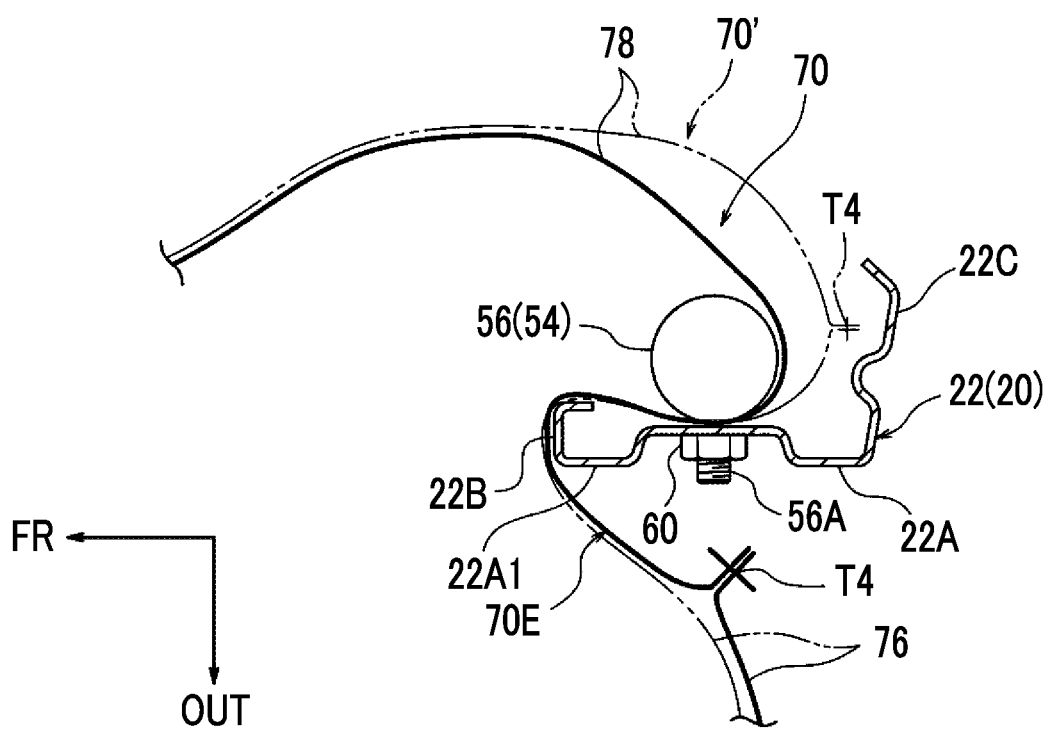
FIG. 15 is an enlarged sectional view illustrating a portion of FIG. 14.

FIG. 14 is a plan sectional view illustrating the inflated and deployed state of the side airbag 70 in a vehicle seat 120 provided with a side airbag device according to a third embodiment. In the side airbag 70 according to the third embodiment, the additional chamber 70RA and the gas introduction port 84 according to the first embodiment are not provided. Instead, in the third embodiment, the side airbag 70 is attached to the outer side frame 22 in a different manner from that of the first embodiment (see FIGS. 14 and 15). Accordingly, the inflation width of the side airbag 70 in the vehicle-width direction is set to be greater outside the outer side surface 22A1 of the outer side frame 22 in the vehicle-width direction than inside the outer side surface 22A1 in the vehicle-width direction. This will be described in detail below.

As in the first embodiment, the side airbag 70 according to the embodiment includes the outer base cloth 76 and the inner base cloth 78. The outer base cloth 76 and the inner base cloth 78 are formed to have the same size and shape (see FIG. 16A). The above-described points are the same as those of the first embodiment. However, in the third embodiment, the stud bolt 56A of the inflator 56 penetrates through the rear end portion of the inner base cloth 78. When the inflator 56 is attached to the outer side frame 22, the inflator 56 is rotated in the direction of the arrow R shown in FIG. 16B such that the stud bolt 56A is directed outward in the vehicle-width direction as illustrated in FIG. 16C. In this posture, the inflator 56 is fastened and fixed to the outer side frame 22 by using the stud bolt 56A and the nut 60 (see FIG. 16D).

In FIGS. 16A to 16D, illustration of the front-rear partition tether 74 is omitted. In FIGS. 16A to 16D, for ease of understanding of the description, the deployed state of the side airbag 70 is illustrated. However, in reality, the inflator 56 is fastened and fixed to the outer side frame 22 while the side airbag 70 is in a folded state. As in the first embodiment, the stud bolt 56A of the inflator 56 indicated by the two-dot chain line (imaginary line) in FIG. 16A penetrates through the rear end portion of the outer base cloth 76.

Figure 16A:
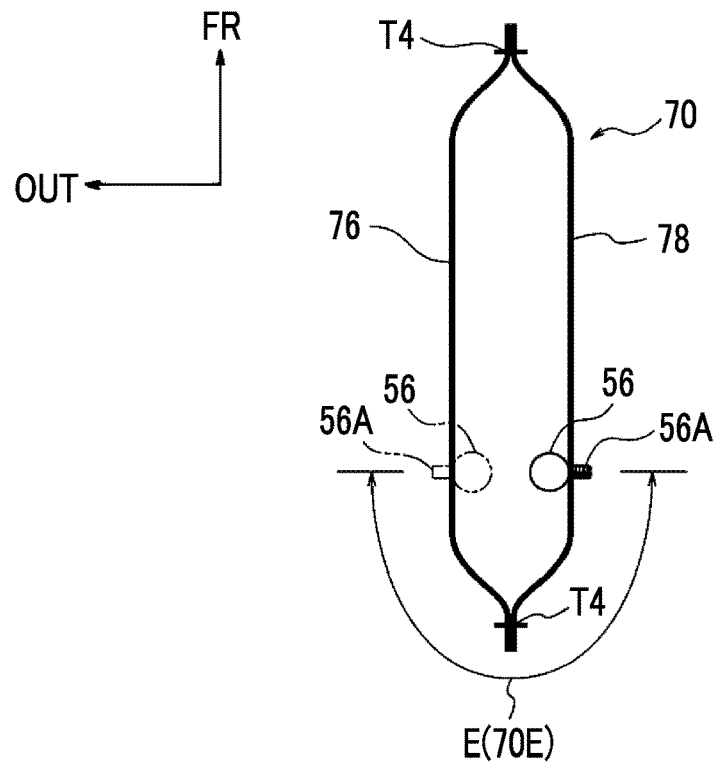
FIG. 16A is a plan sectional view illustrating a state in which the side airbag according to the third embodiment is not inflated and deployed, and is a view illustrating a first step of an attachment method of attaching the side airbag to an outer side frame.
Figure 16B:
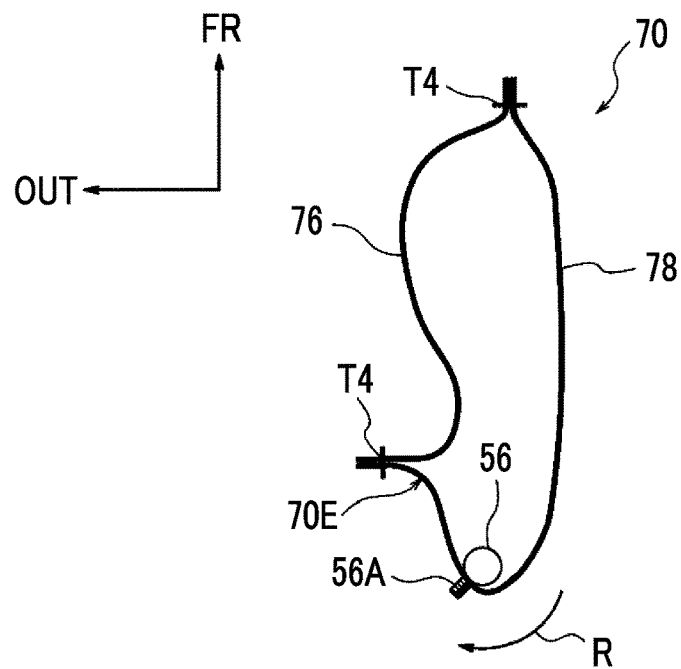
FIG. 16B is a plan sectional view illustrating a second step of the attachment method.
Figure 16C:
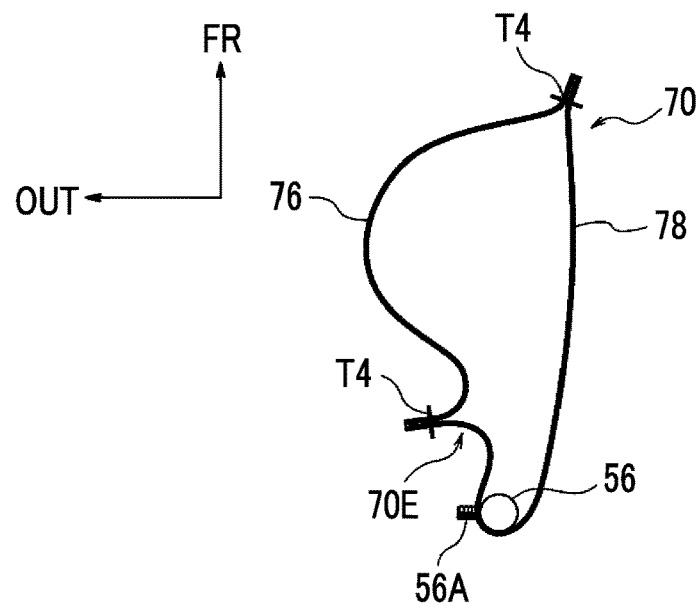
FIG. 16C is a plan sectional view illustrating a third step of the attachment method.
Figure 16D:
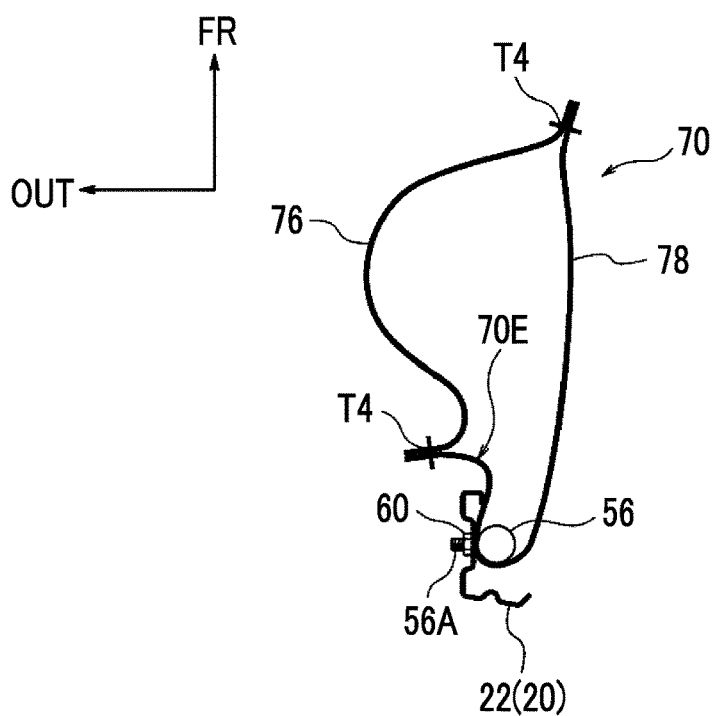
FIG. 16D is a plan sectional view illustrating a fourth step of the attachment method.

In the third embodiment, in the side airbag 70, the range indicated by the arrow E in FIG. 16A is set as an outer excess length portion 70E. The outer excess length portion 70E is constituted by a portion (rear end portion) of the outer base cloth 76 and a portion (rear end portion) of the inner base cloth 78. Since the outer excess length portion 70E is set in the side airbag 70, in the plan sectional view of the side airbag 70 in the inflated and deployed state, the peripheral length of the side airbag 70 is greater outside the outer side surface 22A1 of the outer side frame 22 in the vehicle-width direction than inside the outer side surface 22A1 in the vehicle-width direction (see FIG. 14). Accordingly, the inflation width of the side airbag 70 in the vehicle-width direction is set to be greater outside the outer side surface 22A1 of the outer side frame 22 in the vehicle-width direction than inside the outer side surface 22A1 in the vehicle-width direction (W1>W2 in FIG. 14).

Therefore, also in the third embodiment, similarly to the first embodiment, the inflated and deployed side airbag 70 easily receives a reaction force from the door trim DT fast, and thus the initial occupant restraint performance of the side airbag 70 is improved. In the third embodiment, compared to the configuration in which the stud bolt 56A of the inflator 56 penetrates through the rear end portion of the outer base cloth 76 (see the side airbag 70' indicated by the two-dot chain line in FIGS. 14 and 15), the inflation range of the side airbag 70 is expanded outward of the outer side frame 22 in the vehicle-width direction and is contracted inside the outer side frame 22 in the vehicle-width direction. Accordingly, the seated occupant P is less likely to receive an excessive load from a portion of the side airbag 70 that inflates and deploys inward of the outer side frame 22 in the vehicle-width direction. Furthermore, in the third embodiment, since the side airbag 70 is manufactured by using the outer base cloth 76 and the inner base cloth 78 having the same size and shape, the side airbag 70 which easily inflates and deploys to a sufficiently large extent toward the outside in the vehicle-width direction can be manufactured by using an existing side airbag.

In the third embodiment, the configuration in which the outer base cloth 76 and the inner base cloth 78 are formed to have the same size and shape is employed. However, the disclosure is not limited thereto. That is, a configuration in which the outer base cloth is formed to be larger than the inner base cloth and a portion of the outer base cloth is regarded as the outer excess length portion may be employed.

Fourth Embodiment

Figure 17:
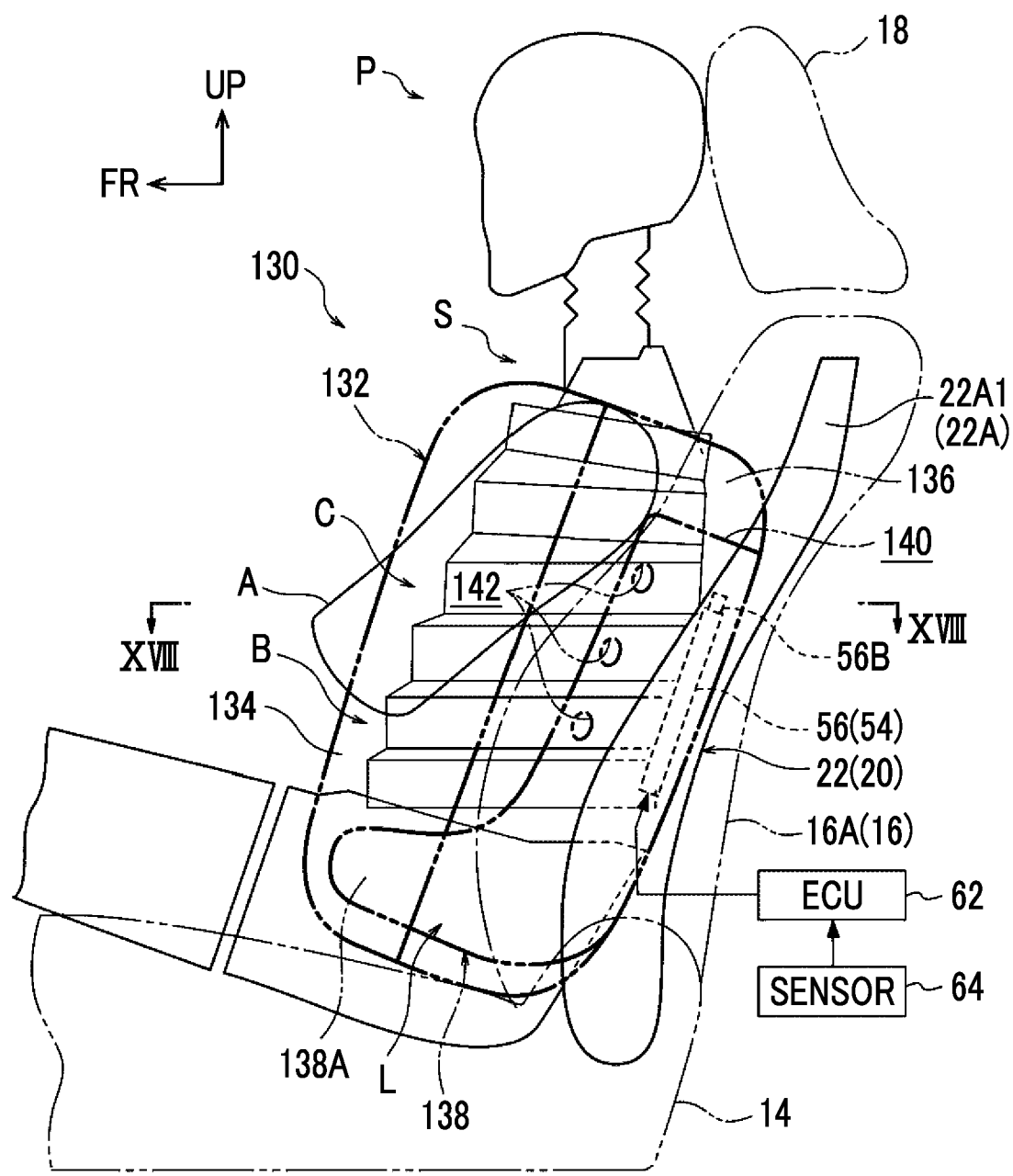
FIG. 17 is a plan view illustrating an inflated and deployed state of a side airbag in a vehicle seat with a side airbag device according to a fourth embodiment.

FIG. 17 is a side view of an inflated and deployed state of a side airbag 132 in a vehicle seat 130 provided with a side airbag device according to a fourth embodiment. In the fourth embodiment, the configuration of the side airbag 132 is different from that of the side airbag 70 according to the first embodiment. The side airbag 132 includes a front base cloth 134 and a rear base cloth 136 arranged in the vehicle front-rear direction in the inflated and deployed state. The front base cloth 134 and the rear base cloth 136 are formed by cutting the same cloth material as the outer base cloth 76 according to the first embodiment and the like into a long rectangular shape. The front base cloth 134 and the rear base cloth 136 are formed to have the same size and shape. As the base cloth 134, 136 are sewn to each other at sewn portions T11, T12 illustrated in FIG. 18 and sewn portions (not illustrated), the side airbag 132 is formed in an elongated bag shape.

In the rear portion of the side airbag 132, a diffuser 138 which is made of cloth and has a bottomed tubular shape with an opening 140 at its upper end portion is disposed. The diffuser 138 is formed by sewing the same cloth material as the outer base cloth 76 according to the first embodiment and the like into the bottomed tubular shape, and is disposed in the up-down direction of the side airbag 132 as its axial direction. Reference numerals T13, T14 illustrated in FIGS. 18 and 19 denote sewn portions formed by sewing the cloth material forming the diffuser 138 to the rear base cloth 136, and a portion of the diffuser 138 is formed of a portion of the rear base cloth 136. The diffuser 138 is configured to be folded together with the side airbag 132 and accommodated in the outer side portion 16A.

Figure 18:
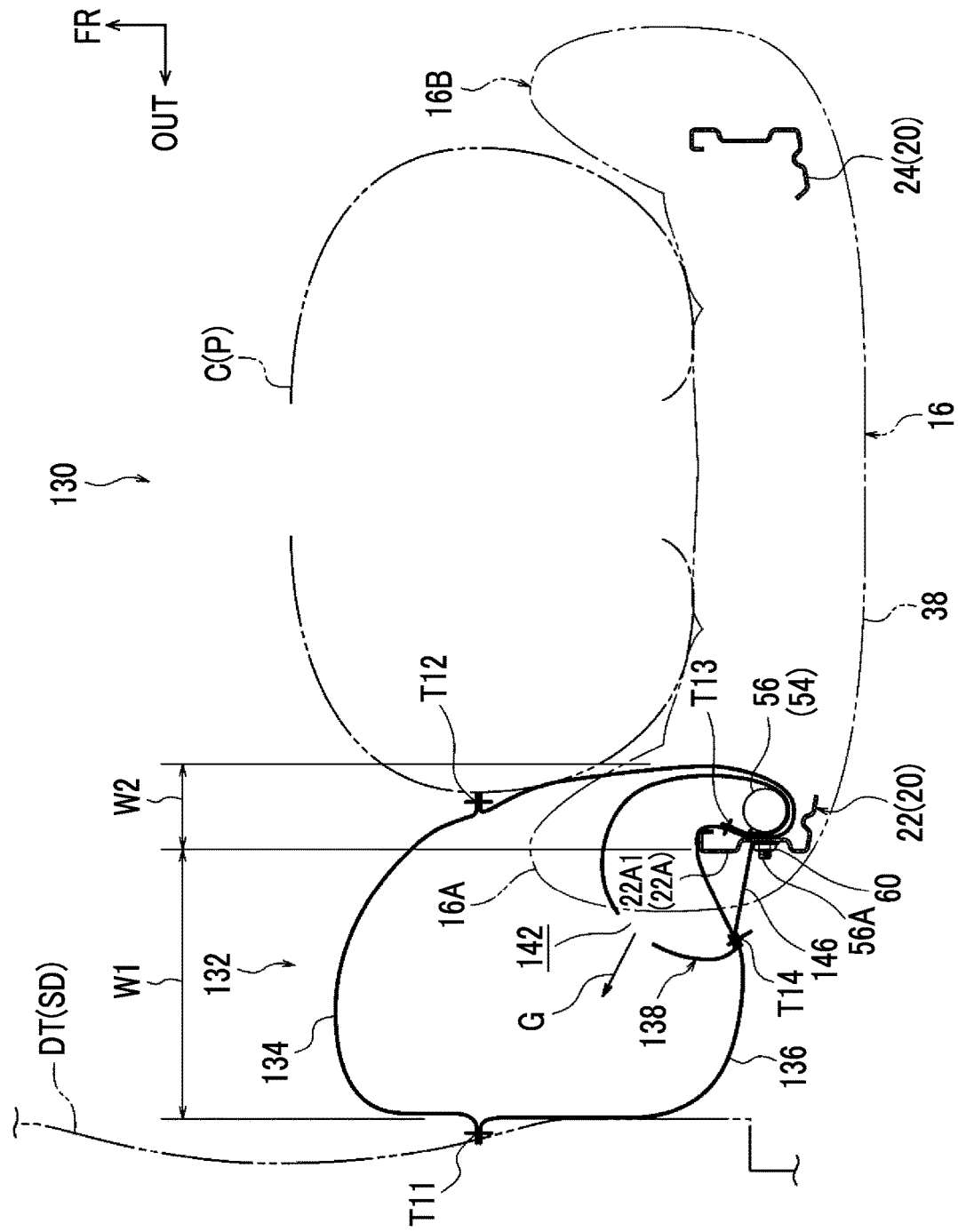
FIG. 18 is an enlarged sectional view illustrating a cut section taken along line XVIII-XVIII of FIG. 17, and is a view illustrating the inflated and deployed state of the side airbag according to the fourth embodiment.

The gas generating device 54 is accommodated in the upper portion side of the diffuser 138. As illustrated in FIG. 18, the stud bolt 56A of the inflator 56 included in the gas generating device 54 penetrates through the diffuser 138, the rear base cloth 136, and the side wall portion 22A of the outer side frame 22 from the inside in the vehicle-width direction and is screwed to the nut 60. Accordingly, the side airbag 132 is fastened and fixed to the inner side surface of the side wall portion 22A in the vehicle-width direction using the inflator 56. A plurality of (here, three) gas ejecting ports (openings) 142 is formed along the axial direction of the diffuser 138 on the upper portion side of the diffuser 138. Therefore, when the inflator 56 is operated, gas generated by the inflator 56 in the diffuser 138 is ejected from the openings 140 of the upper end portion of the diffuser 138 and the gas ejecting ports 142 into the side airbag 132. Accordingly, the diffuser 138 and the side airbag 132 are configured to inflate and deploy.

Specifically, as illustrated in FIG. 17, the side airbag 132 inflates and deploys in a long rectangular shape having the up-down direction of the seat back 16 as its longitudinal direction as viewed in the vehicle-width direction and restrains portions from the shoulder S to the waist L of the seated occupant P. The gas ejecting ports 142 are set to face the outside in the vehicle-width direction in a state in which the diffuser 138 is inflated and deployed. Accordingly, gas generated by the inflator 56 in the diffuser 138 is ejected from the gas ejecting ports 142 toward the outside in the vehicle-width direction. In the inflated and deployed state of the side airbag 132, a front extension portion 138A which extends toward the vehicle front side is provided in the lower end portion of the diffuser 138 positioned at the height of the waist L of the seated occupant P. The front extension portion 138A is formed to inflate and deploy so as to overlap the front portion and the rear portion of the waist L of the seated occupant P as viewed in the vehicle-width direction.

Figure 19:
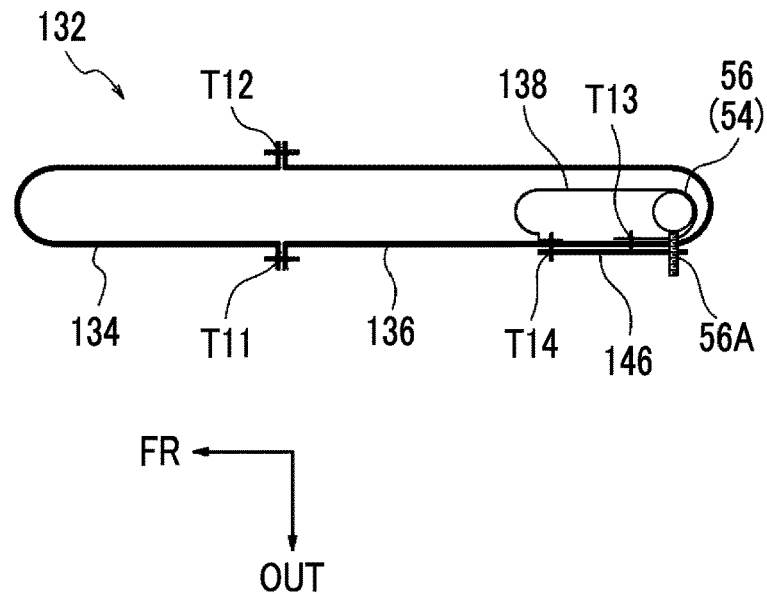
FIG. 19 is a plan sectional view illustrating a state in which the side airbag according to the fourth embodiment is not inflated and deployed.

Furthermore, the side airbag 132 includes a strap (extension member; not illustrated in FIG. 17) 146 illustrated in FIGS. 18 and 19. For example, the strap 146 is formed by cutting the same cloth material as the outer base cloth 76 into a substantially rectangular shape. A first end portion (first end edge portion) of the strap 146 is sewn to the rear base cloth 136 at the sewn portion T14 described above. The sewn portion T14 is set to the outer side surface of the side airbag 132 in the inflated and deployed state in the vehicle-width direction (here, the portion of the outer side of the rear base cloth 136 in the vehicle-width direction). A second end portion (second end edge portion) of the strap 146 overlaps the outer side surface of the side wall portion 22A of the outer side frame 22 in the vehicle-width direction, and the stud bolt 56A of the inflator 56 penetrates through the second end portion of the strap 146 and is screwed to the nut 60. Accordingly, the second end portion of the strap 146 is fastened (fixed) to the outer side frame 22 using the stud bolt 56A and the nut 60. The strap 146 is configured to extend during the inflation and deployment of the side airbag 132 so as to pull the outer side surface of the side airbag 132 in the vehicle-width direction (here, the outer portion of the rear base cloth 136 in the vehicle-width direction) toward the vehicle rear side. A bracket to which the second end portion of the strap 146 is locked or fixed may also be configured to be attached to the outer side frame 22. In this case, the bracket is regarded as a portion of the "outer side frame". The other configurations in the fourth embodiment are the same as those of the first embodiment.

In the fourth embodiment, when the side airbag 132 inflates and deploys, the strap 146 in which the first end portion is sewn to the outer side surface of the side airbag 132 in the vehicle-width direction and the second end portion is locked to the outer side frame 22 extends such that the outer side surface of the side airbag 132 in the vehicle-width direction is pulled toward the vehicle rear side. Accordingly, the inflation width of the side airbag 132 in the vehicle-width direction is greater outside the outer side surface 22A1 of the outer side frame 22 in the vehicle-width direction than inside the outer side surface 22A1 in the vehicle-width direction (W1>W2 in FIG. 18). Therefore, also in the fourth embodiment, similarly to the first embodiment, the inflated and deployed side airbag 132 easily receives a reaction force from the door trim DT fast, and thus the initial occupant restraint performance of the side airbag 70 is improved.

Furthermore, since the side airbag 132 is forcibly inflated and deployed toward the outside in the vehicle-width direction by the strap 146, it is easy to cause the side airbag 132 to inflate and deploy to a sufficiently large extent toward the outside in the vehicle-width direction. The deployment behavior of the side airbag 132 can be stabilized by the tension of the strap 146.

Furthermore, in the fourth embodiment, the side airbag 132 is configured to be formed in a bag shape by sewing the front base cloth 134 and the rear base cloth 136 arranged in the vehicle front-rear direction in the inflated and deployed state. Here, for example, a general side airbag is configured to be formed in a bag shape by sewing a pair of sheets of base cloth arranged in the vehicle-width direction in the inflated and deployed state and thus easily inflates and deploys in the vehicle front-rear direction in the plan view. Contrary to this, the side airbag 132 according to the embodiment easily inflates and deploys in the vehicle-width direction in the plan view, and thus the side airbag 132 easily inflates and deploys between the seated occupant P and the door trim DT within a short period of time.

In the fourth embodiment, the diffuser 138 which is made of cloth and has a bottomed tubular shape with the opening 140 at its upper end portion is disposed in the rear portion of the side airbag 132, and the inflator 56 is accommodated in the diffuser 138. Therefore, when the inflator 56 is operated, the diffuser 138 inflates and deploys fast at a high pressure. As described above, since the diffuser 138 which inflates and deploys fast at a high pressure is provided in the side airbag 132, a region that reaches a high pressure can be easily adjusted by setting the size or shape of the diffuser 138. As a result, for example, the harmfulness to the seated occupant P can be further reduced.

Furthermore, the front extension portion 138A which extends toward the vehicle front side is provided in the lower end portion of the diffuser 138 positioned at the height of the waist L of the seated occupant P in the inflated and deployed state of the side airbag 132. Accordingly, a relatively wide range of the waist L of the seated occupant P can be restrained fast by the diffuser 138 having a high pressure. In addition, even in a case where the side airbag 132 and the diffuser 138 inflate and deploy in a state in which the seated occupant P is located at an inappropriate position which is the inflation and deployment region of the side airbag 132, the waist L of the seated occupant P that has relatively high load resistance receives a load from the diffuser 138, and thus so-called OOP performance (the ability to further reduce the harmfulness to the seated occupant at the inappropriate position) can be favorably secured.

In the fourth embodiment, gas generated by the inflator 56 in the side airbag 132 is ejected upward from the openings 140 at the upper end portion of the diffuser 138 and is ejected toward the outside in the vehicle-width direction from the gas ejecting ports 142 formed in the diffuser 138 (see the arrow G in FIG. 18). Accordingly, the side airbag 132 easily inflates and deploys fast toward the outside in the vehicle-width direction. Therefore, the effect of making the side airbag 132 come into contact with the door trim DT fast can be further improved. Furthermore, since the gas ejected from the gas ejecting ports 142 is ejected toward the opposite side from the seated occupant P, the safety of the seated occupant P can be favorably secured.

Figure 20A:
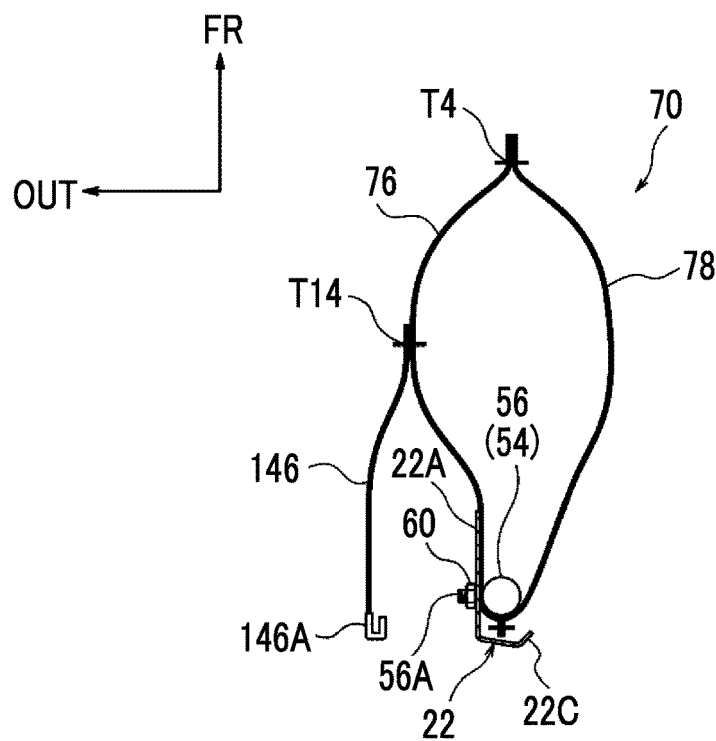
FIG. 20A is a plan sectional view illustrating a modification example of the side airbag according to the fourth embodiment, and is a view illustrating a first step of a locking method of locking a strap to the outer side frame.
Figure 20B:
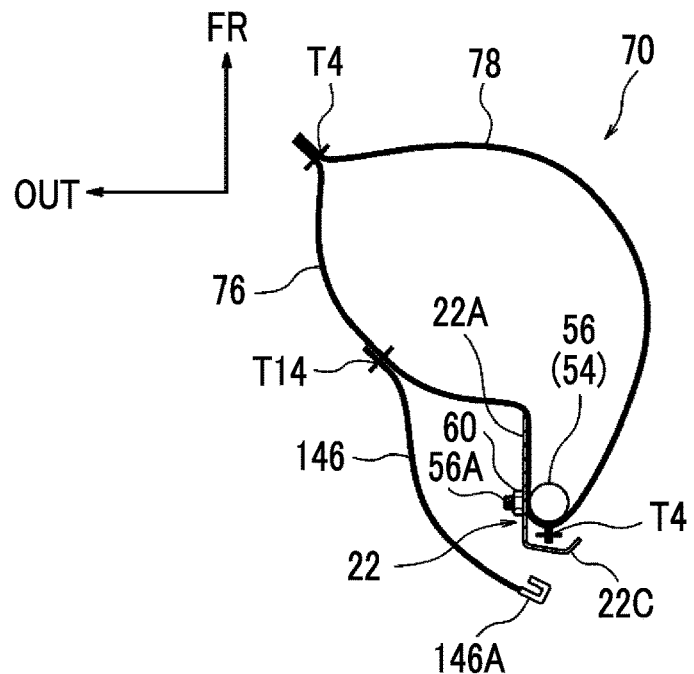
FIG. 20B is a plan sectional view illustrating a second step of the locking method.
Figure 20C:
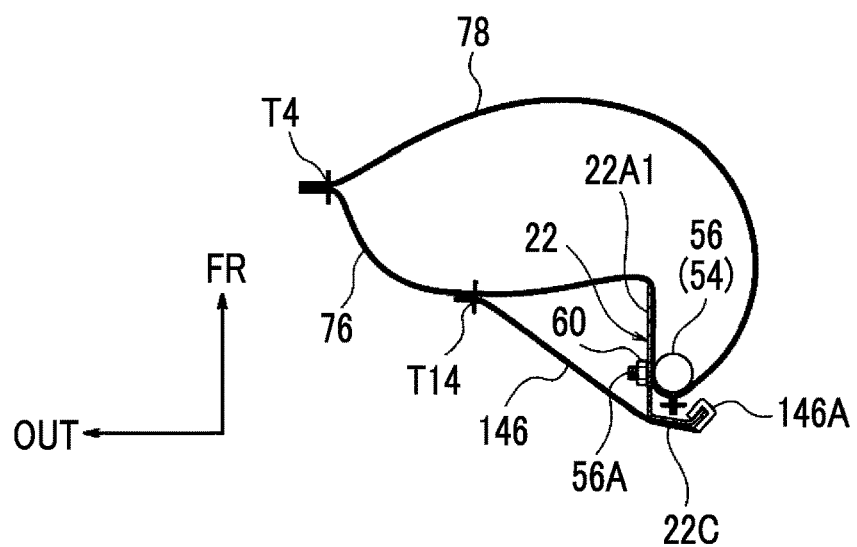
FIG. 20C is a plan sectional view illustrating a third step of the locking method.

In addition, in the fourth embodiment, the side airbag 132 is configured to include the front base cloth 134 and the rear base cloth 136 but is not limited thereto. That is, as illustrated in FIGS. 20A to 20C, a configuration in which the strap 146 is added to the side airbag 70 having the outer base cloth 76 and the inner base cloth 78 may be employed. The first end portion of the strap 146 is sewn to the intermediate portion of the outer base cloth 76 in the front-rear direction at the sewn portion T14. A J-shaped hook 146A is attached to the second end portion of the strap 146. As illustrated in FIG. 20C, the hook 146A is hooked on the tip end portion of the rear flange portion 22C of the outer side frame 22. Accordingly, the second end portion of the strap 146 is configured to be locked to the outer side frame 22 via the hook 146A. In the modification example described above, as in the fourth embodiment, the side airbag 70 can be forcibly inflated and deployed toward the outside in the vehicle-width direction by the tension of the strap 146 (see FIG. 20C) and thus it is easy to cause the side airbag 70 to inflate and deploy to a sufficiently large extent toward the outside in the vehicle-width direction.

Fifth Embodiment

FIG. 21 is a plan sectional view illustrating the inflated and deployed state of a side airbag 152 in a vehicle seat 150 provided with a side airbag device according to a fifth embodiment. Since the side airbag 152 is configured to include elements common to the side airbag 132 according to the fourth embodiment, like elements are denoted by like reference numerals, the detailed descriptions thereof will be omitted, and differences will be mainly described in detail.

Like the side airbag 132 according to the fourth embodiment, the side airbag 152 has a configuration in which the front base cloth 134 and the rear base cloth 136 are sewn to each other to be formed in a bag shape. Like the side airbag 132 according to the fourth embodiment, the side airbag 152 includes a diffuser 154 provided with the gas ejecting ports 142 and the strap 146. However, unlike the diffuser 138 according to the fourth embodiment, the diffuser 154 according to the fifth embodiment is formed in a tubular shape provided with openings (not illustrated) in both the upper and lower end portions and is disposed in the rear portion of the side airbag 152 in a posture in which the axial direction thereof follows the up-down direction of the side airbag 152. In the side airbag 152, the rear base cloth 136 is formed to be longer than the front base cloth 134 in the plan sectional view by an excess length portion 136A (see FIG. 22) provided in the rear base cloth 136. The excess length portion 136A is formed as a pleat 156 which protrudes toward the inside of the side airbag 152 and extends in the up-down direction of the side airbag 152, and the outer side frame 22 is configured to be fitted into the pleat 156 from the vehicle rear side. Hereinafter, a method of manufacturing the side airbag 152 will be described.

Figure 23:
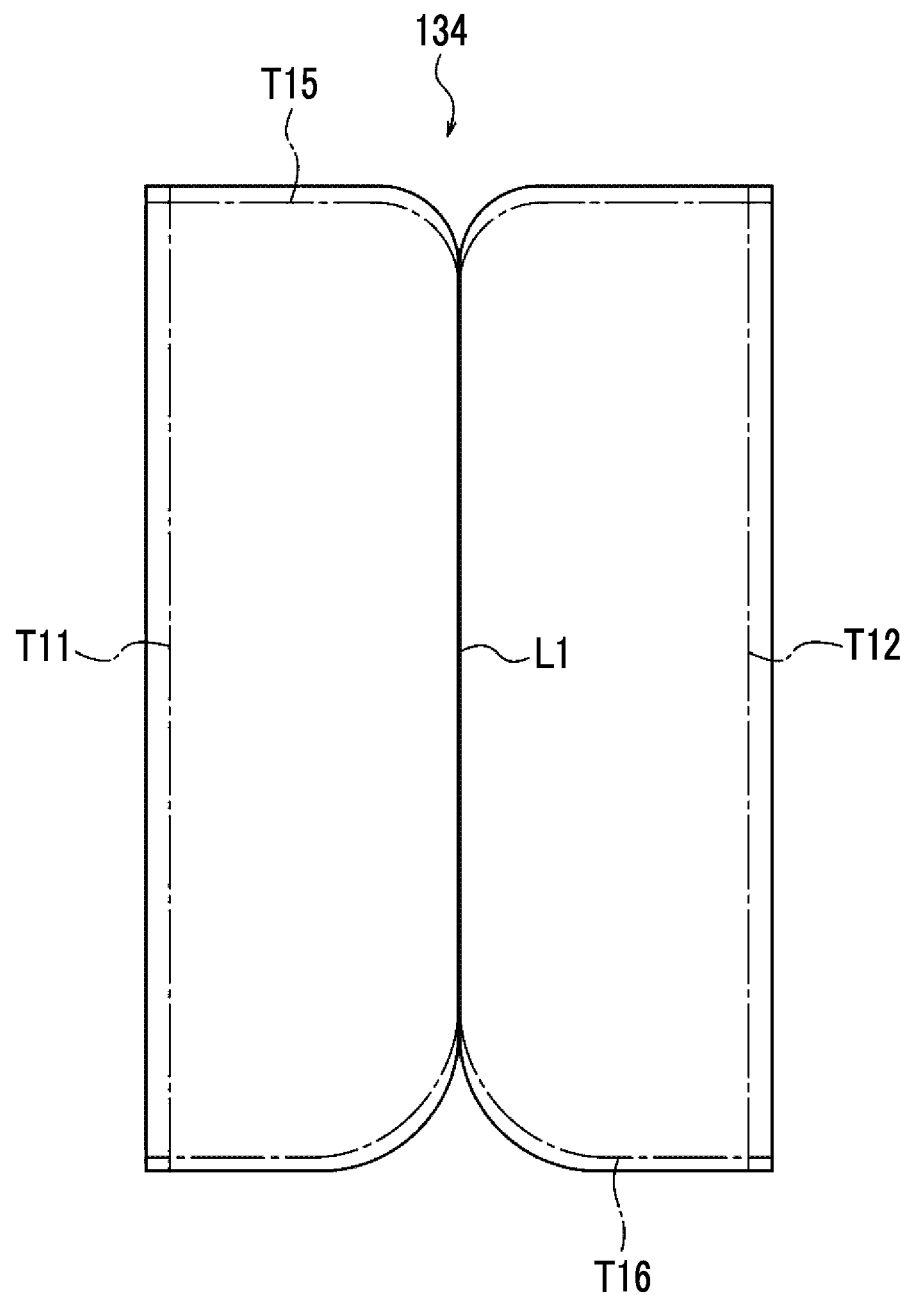
FIG. 23 is a plan development view illustrating front base cloth of the side airbag according to the fifth embodiment.
Figure 24:
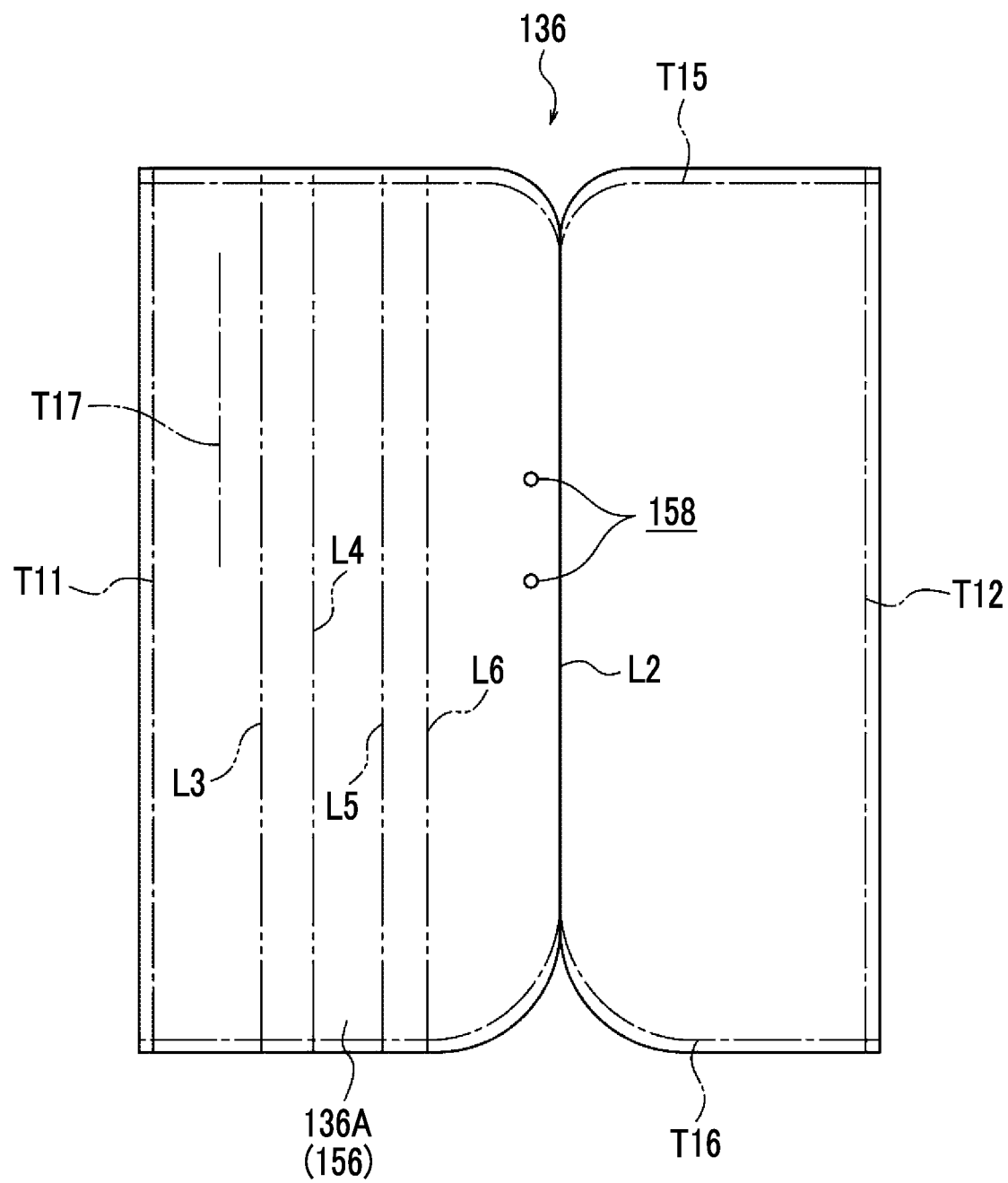
FIG. 24 is a plan development view illustrating rear base cloth of the side airbag according to the fifth embodiment.

In FIGS. 23 to 26, the front base cloth 134, the rear base cloth 136, the strap 146, and the diffuser 154 are respectively illustrated in plan development views. As illustrated in FIG. 23, in the center portion of the front base cloth 134 in the width direction (the right-left direction in FIG. 23), a crease L1 for folding the front base cloth 134 in half is set along the up-down direction of the front base cloth 134. Similarly, as illustrated in FIG. 24, in the vicinity of the center portion of the rear base cloth 136 in the width direction (the right-left direction in FIG. 24), a crease L2 for folding the rear base cloth 136 in half is set along the up-down direction of the rear base cloth 136. As illustrated in FIG. 24, in the vicinity of the center portion of the rear base cloth 136 in the width direction (the right-left direction in FIG. 24) and in the vicinity of the center portion thereof in the up-down direction, a pair of upper and lower bolt insertion holes 158 through which the stud bolts 56A of the inflator 56 are inserted are formed. Furthermore, the excess length portion 136A is provided on a first side of the rear base cloth 136 (the left side in FIG. 24) in the width direction via the crease L2. Accordingly, the first side of the rear base cloth 136 in the width direction via the crease L2 is formed to be wider than a second side thereof in the width direction via the crease L2.

First end portions of the front base cloth 134 and the rear base cloth 136 in the width direction are sewn to each other at the sewn portion T11, and second end portions thereof in the width direction are sewn to each other at the sewn portion T12. In addition, the front base cloth 134 and the rear base cloth 136 are folded in half at the creases L1, L2 respectively and are overlapped. First end portions of the front base cloth 134 and the rear base cloth 136 in the longitudinal direction are sewn to each other at a sewn portion T15, and second end portions of the front base cloth 134 and the rear base cloth 136 in the longitudinal direction are sewn to each other at a sewn portion T16. At this time, the excess length portion 136A of the rear base cloth 136 is folded along creases L3 to L6 illustrated in FIG. 24 and then the sewn portions T15, T16 are formed such that the excess length portion 136A is formed as the pleat 156. Specifically, when viewed from the outside of the side airbag 152, the creases L3, L6 are formed as mountain folds, and the creases L4, L5 are formed as valley folds. Accordingly, the pleat that protrudes toward the inside of the side airbag 152 and extends in the up-down direction of the side airbag 152 is formed.

Figure 25:
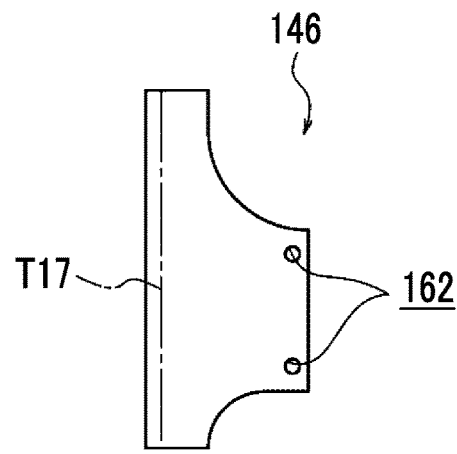
FIG. 25 is a plan development view illustrating a strap of the side airbag according to the fifth embodiment.
Figure 26:
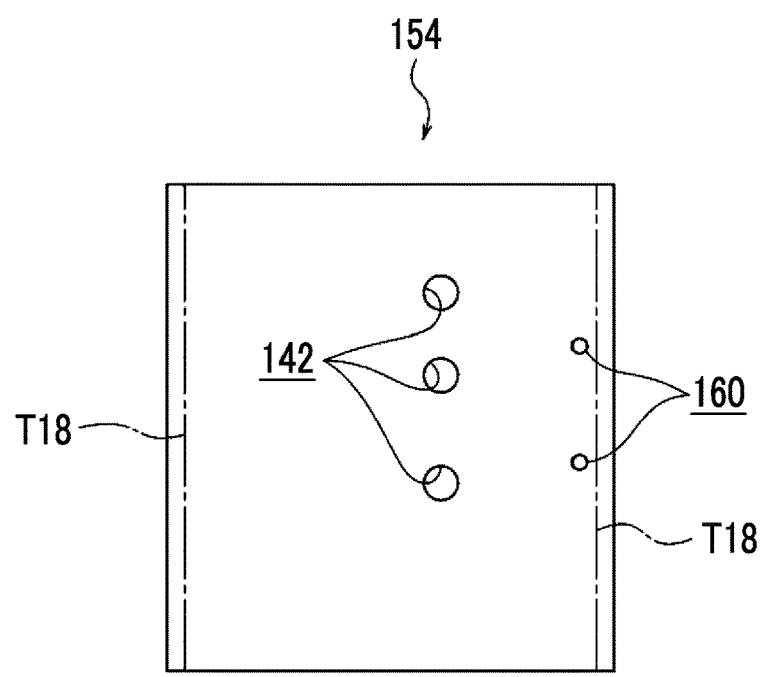
FIG. 26 is a plan development view illustrating a diffuser of the side airbag according to the fifth embodiment.
Figure 27:
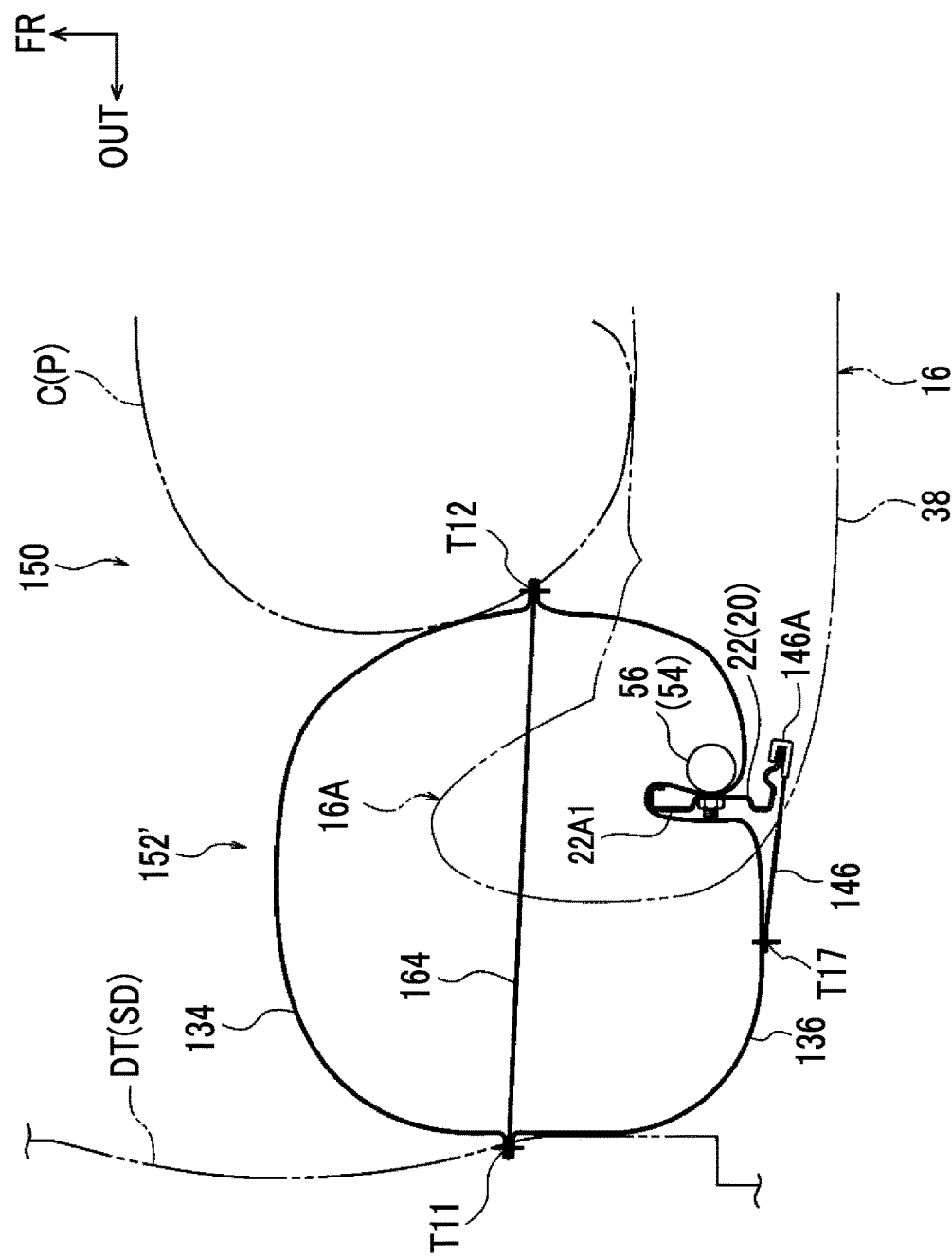
FIG. 27 is a plan sectional view illustrating a modification example of the side airbag according to the fifth embodiment, corresponding to FIG. 21.

The strap 146 illustrated in FIG. 25 is sewn to the rear base cloth 136 at a sewn portion T17 illustrated in FIGS. 24 and 25. For example, the sewing is performed before the front base cloth 134 and the rear base cloth 136 are sewn to each other. The diffuser 154 illustrated in FIG. 26 is rounded in a tubular shape and is sewn at a sewn portion T18. For example, the diffuser 154 is inserted into the side airbag 152 along with the gas generating device 54 before the sewn portions T15, T16 are formed and the side airbag 152 is formed in the bag shape. In the diffuser 154, a pair of upper and lower bolt insertion holes 160 through which the stud bolts 56A of the inflator 56 are inserted is formed, and the stud bolts 56A inserted through the upper and lower bolt insertion holes 160 are inserted through the upper and lower bolt insertion holes 158 formed in the rear base cloth 136. Thereafter, the side airbag 152 is folded together with the diffuser 154 and the strap 146 to form a side airbag module, and the side airbag module is fastened and fixed to the outer side frame 22 using the stud bolts 56A and the nuts 60. At this time, the outer side frame 22 is configured to be fitted (inserted) into the pleat 156 of the folded side airbag 152 from the vehicle rear side.

Figure 22:
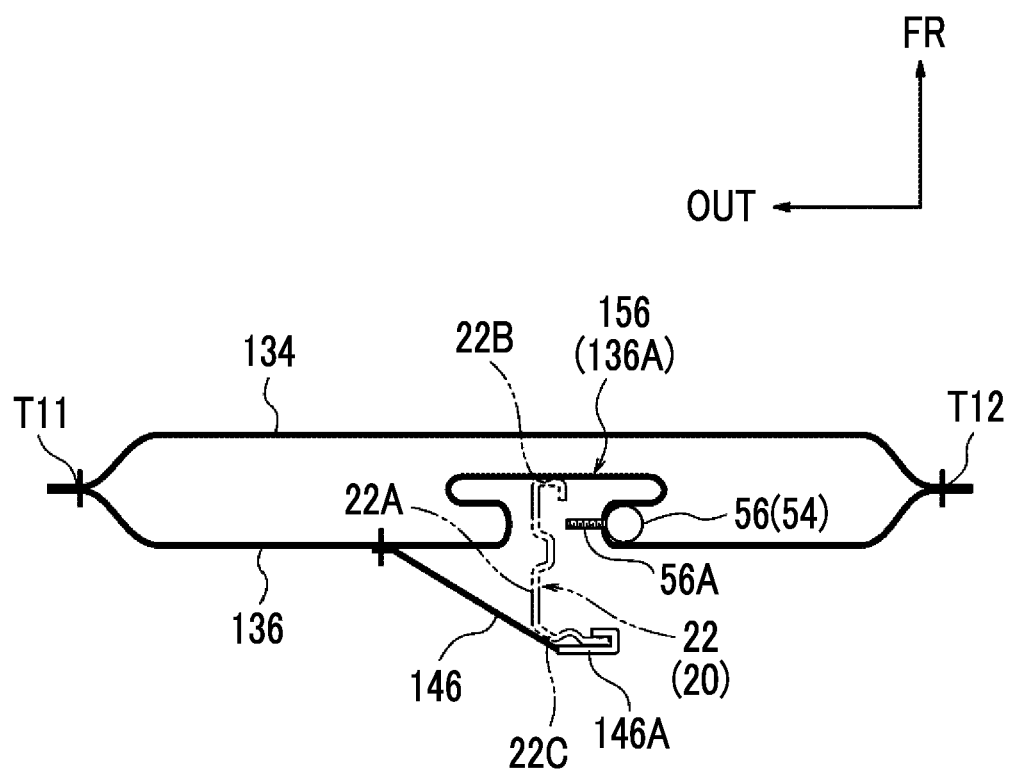
FIG. 22 is a plan sectional view illustrating a state in which the side airbag according to the fifth embodiment is not inflated and deployed.

In addition, in FIGS. 21, 22, the configuration in which the strap 146 is locked to the outer side frame 22 by the hook 146A described above is illustrated. However, the strap 146 is not limited thereto. That is, a configuration in which the strap 146 is locked to the outer side frame 22 by inserting the stud bolts 56A through a pair of upper and lower bolt insertion holes 162 illustrated in FIG. 25 (see the strap 146 illustrated in FIG. 18) may also be employed. In the fifth embodiment, the other configurations are basically the same as those of the fourth embodiment. The side airbag 132 according to the fourth embodiment does not include the pleat 156 (the excess length portion 136A). However, the other points in the configurations and the manufacturing method are common to those of the side airbag 152 according the embodiment.

Also in the fifth embodiment, basically the same actions and effects as the fourth embodiment are exhibited. Moreover, in the fifth embodiment, the outer side frame 22 is fitted into the pleat 156 formed in the rear base cloth 136 of the side airbag 152 from the vehicle rear side. Accordingly, the side airbag 152 that inflates and deploys in the state of extending over the outer side frame 22 from the vehicle front side in the vehicle-width direction easily inflates toward the vehicle rear side and the outside in the vehicle-width direction outside the outer side frame 22 in the vehicle-width direction. Therefore, the side airbag 152 easily comes into contact with the door trim DT faster.

In the configuration in which the side airbag module (the folded side airbag and the inflator) is disposed solely outward of the outer side frame 22 in the vehicle-width direction (outer airbag), at the initial stage of inflation and deployment of the side airbag, it is difficult for the load applied from the side airbag to the seated occupant (hereinafter, referred to as "restraint load") to increase. This is because, in the outer airbag in which the inflator is disposed outward of the outer side frame in the vehicle-width direction, the side airbag has a directivity to inflate and deploy toward the outside in the vehicle-width direction, the restraint load is not applied to the seated occupant (there is no-load inflation and deployment) until the side airbag that is inflated and deployed toward the outside in the vehicle-width direction once inflates and deploys toward the inside in the vehicle-width direction.

On the other hand, in a configuration in which the side airbag module is disposed solely inward of the outer side frame 22 in the vehicle-width direction (inner airbag), although the restraint load increases fast immediately after the inflation and deployment of the side airbag, the restraint load then temporarily decreases. This is because a reaction force from the vehicle body side portion to the side airbag is not obtained until the vehicle body side portion intrudes toward the inside in the vehicle-width direction due to a collision load.

Contrary to this, in the fifth embodiment, as described above, immediately after the inflation and deployment of the side airbag 152, the side airbag 152 receives a reaction force fast from both the outer side frame 22 and the door trim DT (vehicle body side portion), and the restraint load continuously increases from the initial stage of the inflation and deployment of the side airbag 152 to a late stage of the inflation and deployment. As a result, the above-described problems in the outer airbag and the inner airbag can be solved. The excellent effects described above are common to the first to fourth embodiments described above.

In the fifth embodiment, the configuration in which the diffuser 154 (inner baffle) is provided in the single chamber type side airbag 152 is employed. However, the side airbag 152 is not limited thereto. As in a modification example illustrated in FIG. 27, a side airbag 152' may be configured as a two chamber type side airbag. The side airbag 152' according to the modification example described above includes a front-rear partition tether 164 provided between the front base cloth 134 and the rear base cloth 136. The front-rear partition tether 164 is joined to the front base cloth 134 and the rear base cloth 136 at joints (the sewn portions T11, T12) between the front base cloth 134 and the rear base cloth 136. The front-rear partition tether 164 is provided with communication ports (openings) (not illustrated). The side airbag 152' also exhibits basically the same actions and effects as those of the fifth embodiment. In the side airbag 152', the front base cloth 134 and the rear base cloth 136 can be joined together (sewn together) with the front-rear partition tether 164. Therefore, the side airbag 152 divided into the two front and rear chambers by the front-rear partition tether 164 can be easily manufactured.

The side airbag 70 according to the first to third embodiments is configured such that the outer base cloth 76 and the inner base cloth 78 arranged in the vehicle-width direction in the inflated and deployed state are joined to each other. However, the disclosure is not limited thereto. That is, the side airbag 70 according to the first to third embodiments may also be formed in a bag shape by joining the front base cloth and the rear base cloth arranged in the vehicle front-rear direction to each other in the inflated and deployed state.

In the side airbag 70 according to the first to third embodiments, the diffuser 154 according to the fifth embodiment may be provided and the inflator 56 may be configured to be accommodated in the diffuser 154. In this case, gas generated by the inflator 56 in the side airbag 70 is ejected upward and downward from the upper and lower openings of the diffuser 154 and is ejected toward the outside in the vehicle-width direction from the gas ejecting ports 142. Accordingly, the side airbag 70 easily inflates and deploys fast toward the outside in the vehicle-width direction. Since the gas ejected from the gas ejecting ports 142 is ejected toward the opposite side from the seated occupant P, the safety of the seated occupant P can be favorably secured. In a case where the diffuser 154 is provided in the side airbag 70 according to the first embodiment or the second embodiment, the inner tube 90 or the inner tube 108 is omitted.

Besides, the embodiments can be implemented with various modifications without departing from the gist thereof. The scope of the disclosure is not limited to each of the embodiments.

What is claimed is:

1. A vehicle seat with a side airbag device, the vehicle seat comprising:
   a gas generating device attached to an inner side of an outer side frame in a vehicle-width direction, the outer side frame being disposed in a side portion on an outside of a seat back in the vehicle-width direction;
   a side airbag which inflates and deploys to expand over the outer side frame from a vehicle front side of the outer side frame in the vehicle-width direction by receiving gas from the gas generating device accommodated in the side airbag;
   an inflation width expansion portion which is provided in the side airbag and causes an inflation width of the side airbag in the vehicle-width direction to be greater outside a side surface provided on an outside of the outer side frame in the vehicle-width direction than inside the side surface; and
   a diffuser in the side airbag, wherein the gas generating device is in the diffuser, and the diffuser has a gas ejecting port configured to eject gas toward the outside in the vehicle-width direction.

2. The vehicle seat according to claim 1, wherein the inflation width expansion portion is an additional chamber which is attached to an outer side surface of the side airbag in the vehicle-width direction, the side airbag being in an inflated and deployed state, and the additional chamber being configured to inflate and deploy toward an outside in the vehicle-width direction by being supplied with the gas from the gas generating device.

3. The vehicle seat according to claim 2, wherein:
a gas introduction port is provided in the outer side surface of the side airbag in the vehicle-width direction;
the additional chamber includes a pair of front base cloth and rear base cloth arranged in a front-rear direction of the side airbag;
outer peripheral portions of the front base cloth and the rear base cloth excluding first end edge portions are joined to each other; and
the first end edge portions are joined to an edge portion of the gas introduction port.

4. The vehicle seat according to claim 2, wherein:
a gas introduction port is provided in the outer side surface of the side airbag in the vehicle-width direction;
the additional chamber includes a pair of right base cloth and left base cloth arranged in a right-left direction of the side airbag and having outer peripheral portions joined to each other; and
an edge portion of the gas introduction port provided in one of the right base cloth and the left base cloth is joined to an edge portion of the gas introduction port of the gas introduction port in the outer side surface of the side airbag in the vehicle-width direction.

5. The vehicle seat according to claim 1, wherein the inflation width expansion portion is an outer excess length portion which is configured in base cloth of the side airbag such that, in a plan sectional view of the side airbag, a peripheral length of the side airbag is greater outside the side surface in the vehicle-width direction than inside the side surface in the vehicle-width direction.

6. The vehicle seat according to claim 5, wherein:
the base cloth of the side airbag includes outer base cloth, and inner base cloth which is positioned inward of the outer base cloth in the vehicle-width direction in the inflated and deployed state of the side airbag;
the outer base cloth and the inner base cloth are formed to have the same size and shape to cause outer peripheral portions of the outer base cloth and the inner base cloth to be joined to each other;
the side airbag is fixed to the outer side frame by using a stud bolt of the gas generating device which penetrates through the inner base cloth and the outer side frame; and
the outer excess length portion is formed of a portion of the outer base cloth and a portion of the inner base cloth.

7. The vehicle seat according to claim 1, wherein the inflation width expansion portion is a strap in which a first end portion is joined to an outer side surface of the side airbag in the vehicle-width direction in an inflated and deployed state of the side airbag and a second end portion is locked or fixed to the outer side frame and is extended during inflation and deployment of the side airbag to pull the outer side surface of the side airbag in the vehicle-width direction toward a vehicle rear side.

8. The vehicle seat according to claim 1, wherein the side airbag is formed in a bag shape by joining front base cloth and rear base cloth arranged in a vehicle front-rear direction to each other in the inflated and deployed state of the side airbag.

9. The vehicle seat according to claim 1, wherein:
the side airbag is divided into a front chamber and a rear chamber by a front-rear partition tether including a front-rear partition portion which extends in an up-down direction of the side airbag and is provided with communication ports;
the gas generating device is accommodated in the rear chamber; and
the rear chamber is configured to come into contact with a seated occupant and a vehicle cabin side portion in a state in which the side airbag is inflating and deploying.

10. The vehicle seat according to claim 1, wherein:
the diffuser is in a rear portion of the side airbag,
the diffuser has a bottomed tubular shape with an opening at an upper end portion of the diffuser,
the diffuser is made of cloth, and
a front extension portion which extends toward the vehicle front side is provided in a lower end portion of the diffuser positioned at a height of a waist of the seated occupant in the inflated and deployed state of the side airbag.

11. The vehicle seat according to claim 8, wherein:
the rear base cloth is longer than the front base cloth in a plan sectional view by an excess length portion provided in the rear base cloth;
the excess length portion is a pleat which protrudes toward an inside of the side airbag and extends in an up-down direction of the side airbag; and
the outer side frame is fitted into the pleat from the vehicle rear side.

12. The vehicle seat according to claim 8, further comprising a front-rear partition tether provided between the front base cloth and the rear base cloth, the front-rear partition tether being jointed to a joint between the front base cloth and the rear base cloth.

13. The vehicle seat according to claim 1, wherein:
the diffuser is in a rear portion of the side airbag,
the diffuser has a tubular shape with openings at both upper and lower end portions of the diffuser, and
the diffuser is made of cloth.

14. The vehicle seat according to claim 2, wherein:
the side airbag is divided into a front chamber and a rear chamber by a front-rear partition tether including a front-rear partition portion which extends in an up-down direction of the side airbag and is provided with communication ports;
the gas generating device is accommodated in the rear chamber; and
a capacity of the additional chamber is smaller than a capacity of the rear chamber.

15. The vehicle seat according to claim 9, wherein:
the rear chamber includes a chest-abdomen restraint portion that restrains rear portions of a chest and an abdomen of an occupant seated on the vehicle seat, and a waist restraint portion that restrains a front portion and a rear portion of a waist of the occupant;
the chest-abdomen restraint portion inflates and deploys primarily within an outer side portion on a vehicle rear side of the front chamber and restrains portions of the occupant from an upper end portion of the rear portion of the chest of the occupant to a lower end portion of the rear portion of the abdomen of the occupant; and
a rear portion side of the waist restraint portion which restrains the rear portion of the waist of the occupant inflates and deploys within the outer side portion, and a front portion side of the waist restraint portion which restrains the front portion of the waist of the occupant inflates and deploys toward a vehicle front side relative to the outer side portion along with the front chamber.

16. The vehicle seat according to claim 1, wherein
the side airbag is divided into a front chamber and a rear chamber by a front-rear partition tether including a front-rear partition portion which extends in an up-down direction of the side airbag and is provided with communication ports,
the gas generating device is accommodated in the rear chamber, and is accommodated in the side portion of the side airbag outside the seat back in the vehicle-width direction, and
the side airbag in a stored state extends over the outer side frame from the vehicle front side in the vehicle-width direction, an outer storage portion including the front chamber is folded outward of the outer side frame in the vehicle-width direction, and the outer storage portion is closer to the vehicle front side than an inner storage portion positioned inward of the outer side frame in the vehicle-width direction.

17. The vehicle seat according to claim 1, wherein
the diffuser has a bottomed tubular shape with an opening at an upper end portion of the diffuser, and
a front extension portion which extends toward the vehicle front side is provided in a lower end portion of the diffuser positioned at a height of a waist of the seated occupant in the inflated and deployed state of the side airbag.

18. The vehicle seat according to claim 1, wherein the diffuser has a tubular shape with openings at both upper and lower end portions of the diffuser.

19. A vehicle seat with a side airbag device, the vehicle seat comprising:
a gas generating device attached to an inner side of an outer side frame in a vehicle-width direction, the outer side frame being disposed in a side portion on an outside of a seat back in the vehicle-width direction;
a side airbag which inflates and deploys to expand over the outer side frame from a vehicle front side of the outer side frame in the vehicle-width direction by receiving gas from the gas generating device accommodated in the side airbag; and
an inflation width expansion portion which is provided in the side airbag and causes an inflation width of the side airbag in the vehicle-width direction to be greater outside a side surface provided on an outside of the outer side frame in the vehicle-width direction than inside the side surface, wherein
the side airbag is divided into a front chamber and a rear chamber by a front-rear partition tether including a front-rear partition portion which extends in an up-down direction of the side airbag and is provided with communication ports,
the gas generating device is accommodated in the rear chamber, and is accommodated in the side portion of the side airbag outside the seat back in the vehicle-width direction, and
the side airbag in a stored state extends over the outer side frame from the vehicle front side in the vehicle-width direction, an outer storage portion including the front chamber is folded outward of the outer side frame in the vehicle-width direction, and the outer storage portion is closer to the vehicle front side than an inner storage portion positioned inward of the outer side frame in the vehicle-width direction.

* * * * *